(12) United States Patent
Moreno et al.

(10) Patent No.: US 10,978,059 B2
(45) Date of Patent: Apr. 13, 2021

(54) SPEAKER DIARIZATION USING SPEAKER EMBEDDING(S) AND TRAINED GENERATIVE MODEL

(71) Applicant: Google LLC, Mountain View, CA (US)

(72) Inventors: Ignacio Lopez Moreno, New York, NY (US); Luis Carlos Cobo Rus, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/607,977

(22) PCT Filed: Sep. 25, 2018

(86) PCT No.: PCT/US2018/052724
§ 371 (c)(1),
(2) Date: Oct. 24, 2019

(87) PCT Pub. No.: WO2020/068056
PCT Pub. Date: Apr. 2, 2020

(65) Prior Publication Data
US 2020/0342857 A1    Oct. 29, 2020

(51) Int. Cl.
| | |
|---|---|
| *G10L 15/00* | (2013.01) |
| *G10L 15/20* | (2006.01) |
| *G10L 15/30* | (2013.01) |
| *G10L 15/02* | (2006.01) |
| *G10L 21/0208* | (2013.01) |
| *G10L 15/06* | (2013.01) |

(52) U.S. Cl.
CPC .............. *G10L 15/20* (2013.01); *G10L 15/02* (2013.01); *G10L 15/30* (2013.01); *G10L 15/063* (2013.01); *G10L 21/0208* (2013.01)

(58) Field of Classification Search
CPC combination set(s) only.
See application file for complete search history.

(56) References Cited

U.S. PATENT DOCUMENTS

| | | |
|---|---|---|
| 2014/0074467 A1 | 3/2014 | Ziv et al. |
| 2015/0025887 A1 | 1/2015 | Sidi et al. |
| 2017/0084295 A1 | 3/2017 | Tsiartas et al. |
| 2017/0103752 A1 | 4/2017 | Senior et al. |

OTHER PUBLICATIONS

European Patent Office: Examination Report issued in Application No. 18786558.9 dated Aug. 21, 2020.
(Continued)

*Primary Examiner* — Vu B Hang
(74) *Attorney, Agent, or Firm* — Middleton Reutlinger

(57) ABSTRACT

Speaker diarization techniques that enable processing of audio data to generate one or more refined versions of the audio data, where each of the refined versions of the audio data isolates one or more utterances of a single respective human speaker. Various implementations generate a refined version of audio data that isolates utterance(s) of a single human speaker by generating a speaker embedding for the single human speaker, and processing the audio data using a trained generative model—and using the speaker embedding in determining activations for hidden layers of the trained generative model during the processing. Output is generated over the trained generative model based on the processing, and the output is the refined version of the audio data.

15 Claims, 13 Drawing Sheets

(56) References Cited

OTHER PUBLICATIONS

PCT International Search Report and Written Opinion for PCT/US2018/052724 dated Jan. 28, 2019. 16 Pages.
Noulas, A. et al., "A Hybrid Generative Discriminative Approach to Speaker Diarization", Proceedings of 5th International Workshop, Machine Learning for Multimodal Interaction, XP055543840, Retrieved from internet: URL: https://link.springer.com/content/pdf/10.1007/978-3-540-85853-9.pdf [retrieved Jan. 17, 2019], 12 pages; Sep. 10, 2008.
Popescu-Belis, A. et al., "Machine Learning for Multimodal Interaction"; 5th International Workshop, MLMI 2008, Utrecht, The Netherlands; 375 pages; Sep. 8, 2008.
Oord, A. et al., "WaveNet: A Generative Model for Raw Audio"; arXiv preprint arXiv:1609.03499; 15 pages; Sep. 19, 2016.
International Search Report and Written Opinion issued in Application No. PCT/US2018/052724, dated Jan. 28, 2019.

SPEAKER DIARIZATION USING SPEAKER EMBEDDING(S) AND TRAINED GENERATIVE MODEL

BACKGROUND

Speaker diarization is the process of portioning an input audio stream into homogenous segments according to speaker identity. It answers the question of "who spoke when" in a multi-speaker environment. For example, speaker diarization can be utilized to identify that a first segment of an input audio stream is attributable to a first human speaker (without particularly identifying who the first human speaker is), a second segment of the input audio stream is attributable to a disparate second human speaker (without particularly identifying who the first human speaker is), a third segment of the input audio stream is attributable to the first human speaker, etc. Speaker diarization has a wide variety of applications including multimedia information retrieval, speaker turn analysis, and audio processing.

A typical speaker diarization system usually consists of four steps: (1) speech segmentation, where the input audio is segmented into short sections that are assumed to have a single speaker, and the non-speech sections are filtered out; (2) audio embedding extraction, where specific features are extracted from the segmented sections; (3) clustering, where the number of speakers is determined, and the extracted audio embeddings are clustered into these speakers; and optionally (4) resegmentation, where the clustering results are further refined to produce the final diarization results.

With such a typical speaker diarization system, diarization fails to accurately recognize occurrences of multiple speakers speaking during a given segment. Rather, such a typical system will attribute the given segment to only one of the speakers, or fail to attribute the given segment to any of the speakers. This leads to inaccurate diarization, and can adversely impact other applications that may rely on the diarization results.

Moreover, with such a typical speaker diarization system, errors can be introduced at each step, and can propagate to further steps, thereby causing erroneous diarization results and thereby adversely impacting further applications that may rely on the erroneous diarization results. For example, errors can be introduced in speech segmentation as a result of low resolution of long segments and/or as a result of short segments having insufficient audio to produce accurate audio embeddings. As another example, audio embeddings can be generated locally without using any global information, which can additionally or alternatively introduce errors. As yet another example, clustering of the audio embeddings can additionally or alternatively introduce errors, as it involves unsupervised learning where accuracy is supposed to be low.

SUMMARY

Speaker diarization techniques are described herein that enable processing of a sequence of audio data to generate one or more refined versions of the audio data, where each of the refined versions of the audio data isolates one or more utterances of a single respective human speaker, thereby enabling determination of which portion(s) of the sequence of audio data correspond to respective human speaker(s). For example, assume a sequence of audio data that includes first utterance(s) from a first human speaker, second utterance(s) from a second human speaker, and various occurrences of background noise. Implementations disclosed herein can be utilized to generate first refined audio data that includes only the first utterance(s) from the first human speaker, and excludes the second utterance(s) and the background noise. Moreover, second refined audio data can be generated that includes only the second utterance(s) from the second human speaker, and excludes the first utterance(s) and the background noise. Yet further, in those implementations the first utterance(s) and the second utterance(s) can be isolated, even when one or more of the first and second utterance(s) overlap in the sequence of audio data.

Various implementations generate a refined version of audio data that isolates utterance(s) of a single human speaker by generating a speaker embedding for the single human speaker, and processing the audio data using a trained generative model—and using the speaker embedding in determining activations for hidden layers of the trained generative model during the processing. Output is sequentially generated over the trained generative model based on the processing, and the output is the refined version of the audio data.

In generating the speaker embedding for a single human speaker, one or more instances of speaker audio data, corresponding to the human speaker, can be processed using a trained speaker embedding model to generate one or more respective instances of output. The speaker embedding can then be generated based on the one or more respective instances of output. The trained speaker embedding model can be a machine learning model, such as a recurrent neural network (RNN) model that accepts, as input, a sequence of features of respective audio data frames of any length and that can be utilized to generate, as output based on the input, a respective embedding. Each of the features of audio data frames of a sequence that are processed using the trained speaker embedding model to generate a respective embedding can be based on a respective portion of a respective instance of audio data, such as a 25 millisecond or other duration portion. The features of an audio data frame can be, for example, Mel-frequency cepstral coefficients (MFCCs) and/or other features of the audio data frame. Where the trained speaker embedding model is an RNN model, the RNN model includes one or more memory layers that each include one or more memory units to which input can be sequentially applied and, at each iteration of applied input, the memory unit(s) can be utilized to calculate a new hidden state based on the input of that iteration and based on a current hidden state (that can be based on input(s) of prior iteration(s)). In some implementations, a memory unit can be a long short-term (LSTM) LSTM unit. In some implementations, additional or alternative memory unit(s) may be utilized such as a gated recurrent unit ("GRU").

As one example of generating a speaker embedding for a given speaker, the speaker embedding can be generated during an enrollment process in which the given speaker speaks multiple utterances. Each utterance can be of the same phrase (text-dependent), or of a different phrase (text-independent). Features of audio data corresponding to each instance of the given speaker speaking a respective utterance can be processed over the speaker embedding model to generate respective output that is a respective vector of values. For example, first audio data for a first utterance can be processed to generate a first vector of values, second audio data for a second utterance can be processed to generate a second vector of values, etc. The speaker embedding can then be generated based on the vectors of values.

For example, the speaker embedding can itself be a vector of values, such as centroid or other function of the respective vectors of values.

In implementations that utilize a speaker embedding for a given speaker that is pre-generated (e.g., during an enrollment process), techniques described herein can utilize the pre-generated speaker embedding in generating refined versions of audio data, that isolate utterance(s) of the given speaker, where the audio data is received from the user via a client device and/or a digital system (e.g., an automated assistant) associated with the enrollment process. For example, if audio data is received via a client device of the given user and/or is received after verification of the given user (e.g., using voice fingerprinting from earlier utterance(s) and/or other biometric verification(s)), the speaker embedding for the given user can be utilized to generate a refined version of the audio data in real-time. Such a refined version can be utilized for various purposes, such as voice-to-text conversion of the refined audio data, verifying that segment(s) of the audio data are from the user, and/or other purpose(s) described herein.

In some additional or alternative implementations, a speaker embedding utilized in generating a refined version of audio data can be based on one or more instances of the audio data (to be refined) itself. For example, a voice activity detector (VAD) can be utilized to determine a first instance of voice activity in the audio data, and portion(s) of the first instance can be utilized in generating a first speaker embedding for a first human speaker. For example, the first speaker embedding can be generated based on processing, using the speaker embedding model, features of the first X (e.g., 0.5, 1.0, 1.5, 2.0) second(s) of the first instance of voice activity (the first instance of voice activity can be assumed to be from a single speaker). For instance, the vector of values generated as output based on the processing can be utilized as the first speaker embedding. The first speaker embedding can then be utilized to generate a first refined version of the audio data, that isolates utterance(s) of the first speaker, as described herein. In some of those implementations, the first refined version of the audio data can be utilized to determine those segment(s) of the audio data that correspond to utterance(s) of the first speaker and the VAD can be utilized to determine an additional instance (if any) of voice activity in the audio data that occurs outside of those segment(s). If an additional instance is determined, a second speaker embedding can be generated for a second human speaker, based on processing portion(s) of the additional instance using the speaker embedding model. The second speaker embedding can then be utilized to generate a second refined version of the audio data, that isolate(s) utterance(s) of the second speaker, as described herein. This process can continue until, for example, no further utterance attributable to an additional human speaker is identified in the audio data. Accordingly, in these implementations speaker embeddings utilized in generating refined version(s) of audio data can be generated from the audio data itself.

Regardless of the technique(s) utilized to generate a speaker embedding, implementations disclosed herein process audio data and the speaker embedding, using a trained generative model, to generate a refined version of audio data that isolates utterance(s) (if any) of a speaker corresponding to the speaker embedding. For example, the audio data can be sequentially processed using the trained generative model, and the speaker embedding utilized in determining activations for layers of the trained generative model during the sequentially processing. The trained generative model can be a sequence-to-sequence model and the refined version of the audio data can be sequentially generated as direct output from the trained generative model. The layers of the trained generative model are hidden layers and can include, for example, a stack of dilated causal convolutional layers. The stack of dilated causal convolutional layers enable receptive fields of the convolutional layers to grow exponentially with depth, which can be beneficial in modelling the long-range temporal dependencies in audio signals. In various implementations, the audio data processed using the trained generative model can be at the waveform level and the refined audio data generated using the trained generative model can also be at the waveform level. In some implementations, the trained generative model has a WaveNet model architecture, and has been trained according to techniques described herein.

In various implementations, the trained generative model is trained to model the conditional distribution p(x|h), where x represents the refined version of the audio data, and h represents a speaker embedding. More formally, p(x|h) can be represented as:

$$p(x|h) = \prod_{t=1}^{T} p(x_t | x_1, \ldots x_{t-1}, h),$$

where $x_1 \ldots x_{t-1}$ represents a sequence of T refined audio sample predictions (that can be conditioned on the source audio data), and $x_t$ represents the next refined audio sample prediction (i.e., the next audio sample prediction for the refined version of the audio data). As mentioned above, h represents a speaker embedding and can be a vector of real values with a fixed-sized dimension.

Moreover, in various implementations, the output filter at each of one or more layers of the trained generative model (e.g., at each causal convolutional layer) can be represented by the following equation:

$$z = \tan h(W_{f,k}*x + V_{f,k}^T h) \odot \sigma(W_{g,k}*x + V_{g,k}^T h)$$

where W represents a filter and V represents another filter. Accordingly, the combination of the speaker embedding h with the audio samples x is performed by transforming h with a filter V, transforming the audio samples x with a filter W, and summing the result of both operations. The result (z) of both operations will become the input x for the next layer. Weights of the generative model that are learned during training of the generative model can include the weights of filters W and V. Additional description of the generative model, and of its training, is provided herein.

Utilizing the trained generative model to process given audio data in view of a given speaker embedding of a given speaker, will result in refined audio data that is the same as the given audio data when the given audio data includes only utterance(s) from the given speaker. Further, it will result in refined audio data that is null/zero when the given audio data lacks any utterances from the given speaker. Yet further, it will result in refined audio data that excludes additional sound(s), while isolating utterance(s) from the given speaker, when the given audio data includes utterance(s) from the given speaker and additional sound(s) (e.g., overlapping and/or non-overlapping utterance(s) of other human speaker(s)).

Refined version(s) of audio data can be utilized by various components and for various purposes. As one example, voice-to-text processing can be performed on a refined version of audio data that isolates utterance(s) from a single human speaker. Performing the voice-to-text processing on the refined version of the audio data can improve accuracy of the voice-to-text processing relative to performing the processing on the audio data (or alternative pre-processed versions of the audio data) due to, for example, the refined version lacking background noise, utterance(s) of other user(s) (e.g., overlapping utterances), etc. Moreover, performing the voice-to-text processing on the refined version of the audio data ensures that resulting text belongs to a single speaker. The improved accuracy and/or ensuring that resulting text belongs to a single speaker can directly result in further technical advantages. For example, the improved accuracy of text can increase the accuracy of one or more downstream components that rely on the resulting text (e.g., natural language processor(s), module(s) that generate a response based on intent(s) and parameter(s) determined based on natural language processing of the text). Also, for example, when implemented in combination with an automated assistant and/or other interactive dialog system, the improved accuracy of text can lessen the chance that the interactive dialog system will be unable to convert a spoken utterance to text and/or lessen the chance that the interactive dialog system will incorrectly convert the spoken utterance to text, thereby leading to provision of an erroneous response to the utterance by the dialog system. This can lessen a quantity of dialog turns that would otherwise be needed for a user to again provide the spoken utterance and/or other clarification(s) to the interactive dialog system.

Additionally, or alternatively, refined version(s) of audio data can be utilized to assign segment(s) of audio data to corresponding human speaker(s). The assignment of a segment to a human speaker can be semantically meaningful (e.g., identifying an attribute of the speaker), or can merely indicate to which of one or more non-semantically meaningful speaker labels the segment belongs. Implementations disclosed herein can result in generating more robust and/or more accurate assignments as compared to other speaker diarization techniques. For example, various errors that are introduced with other techniques, such as those mentioned in the background above, can be mitigated through utilization of implementations disclosed herein. Additionally, or alternatively, use of implementations disclosed herein can enable determination of segment(s) that include a respective utterance from each of two or more human speakers, which is not achievable with various other speaker diarization techniques. Further, and additionally or alternatively, implementations disclosed herein can enable speaker diarization to be performed in a more computationally efficient manner as compared to prior speaker diarization techniques. For instance, computationally intensive clustering of prior techniques can be eliminated in various implementations disclosed herein.

In various implementations, techniques described herein are utilized to generate speaker diarization results, perform automatic speech recognition (ASR) (e.g., voice-to-text processing), and/or other processing for audio data that is submitted (e.g., via an application programming interface (API)) as part of a speech processing request. In some of those implementations, results of the processing for the audio data are generated in response to the speech processing request, and are transmitted back to the computing device that transmitted the speech processing request, or transmitted back to a related computing device.

In various implementations, techniques described herein are utilized to generate speaker diarization results for audio data captured by microphone(s) of a client device that includes an automated assistant interface for an automated assistant. For example, the audio data can be a stream of audio data that captures spoken utterance(s) from one or more speaker(s), and techniques described herein can be utilized to generate speaker diarization results, perform automatic speech recognition (ASR), and/or other processing for the stream of audio data.

The above description is provided as an overview of various implementations disclosed herein. Those various implementations, as well as additional implementations, are described in more detail herein.

In some implementations, a method is provided that includes generating a speaker embedding for a human speaker. Generating the speaker embedding for the human speaker can optionally include: processing one or more instances of speaker audio data, corresponding to the human speaker, using a trained speaker embedding model; and generating the speaker embedding based on one or more instances of output each generated based on processing a respective of the one or more instances of speaker audio data using the trained speaker embedding model. The method further includes: receiving audio data that captures one or more utterances of the human speaker and that also captures one or more additional sounds that are not from the human speaker; generating a refined version of the audio data, wherein the refined version of the audio data isolates the one or more utterances of the human speaker from the one or more additional sounds that are not from the human speaker; and performing further processing on the refined version of the audio data.

These and other implementations can include one or more of the following features.

In some implementations, generating the refined version of the audio data includes: sequentially processing the audio data using a trained generative model and using the speaker embedding in determining activations for layers of the trained generative model during the sequentially processing; and sequentially generating, based on the sequentially processing and as direct output from the trained generative model, the refined version of the audio data.

In some implementations, performing the further processing comprises: performing voice-to-text processing on the refined version of the audio data to generate predicted text for the one or more utterances of the human speaker; and/or assigning a single given speaker label to one or more temporal portions of the audio data based on the one or more temporal portions corresponding to at least a threshold level of audio in the refined version of the audio data.

In some implementations, a method is provided that includes invoking an automated assistant client at a client device, where invoking the automated assistant client is in response to detecting one or more invocation queues in received user interface input. The method further includes, in response to invoking the automated assistant client: performing certain processing of initial spoken input received via one or more microphones of the client device; generating a responsive action based on the certain processing of the initial spoken input; causing performance of the responsive action; and determining that a continued listening mode is activated for the automated assistant client at the client device. The method further includes, in response to the continued listening mode being activated: automatically monitoring for additional spoken input after causing performance of at least part of the responsive action; receiving audio data during the automatically monitoring; and determining whether the audio data includes any additional spoken input that is from the same human speaker that provided the initial spoken input. Determining whether the audio data includes the additional spoken input that is from the same human speaker includes: identifying a speaker embedding for the human speaker that provided the initial spoken input; generating a refined version of the audio data that isolates any of the audio data that is from the human speaker, where generating the refined version of the audio data comprises: processing the audio data using a trained generative model and using the speaker embedding in determining activations for layers of the trained generative model during the processing, and generating, based on the processing, the refined version of the audio data; and determining whether the audio data includes the any additional spoken input that is from the same human speaker based on whether any portions of the refined version of the audio data correspond to at least a threshold level of audio. The method further includes, in response to determining that the audio data does not include any additional spoken input that is from the same human speaker suppressing one or both of: performance of at least some of the certain processing, for the audio data; and generating of any additional responsive action that is tailored to the audio data.

In some implementations, a method is provided that includes: receiving a stream of audio data captured via one or more microphones of the client device; retrieving, from local storage of the client device, a previously generated speaker embedding for a human user of the client device; generating, while receiving the stream of audio data, a refined version of the audio data, where the refined version of the audio data isolates the one or more utterances of the human user from any additional sounds that are not from the human speaker, and where generating the refined version of the audio data includes: processing the audio data using a trained generative model and using the speaker embedding (e.g., in determining activations for layers of the trained generative model during the processing), and generating, based on the processing and as direct output from the trained generative model, the refined version of the audio data. The method further includes performing local voice-to-text processing on the refined version of the audio data and/or transmitting the refined version of the audio data to a remote system to cause remote voice-to-text processing to be performed on the refined version of the audio data.

In some implementations, a method of training a machine learning model to generate refined versions, of audio data, that isolate any utterances of a target human speaker, is provided. The method includes: identifying an instance of audio data that includes spoken input from only a first human speaker; generating a speaker embedding for the first human speaker; identifying an additional instance of audio data that lacks any spoken input from the first human speaker, and that includes spoken input from at least one additional human speaker; generating a mixed instance of audio data that combines the instance of audio data and the additional instance of audio data; processing the mixed instance of audio data using the machine learning model and using the speaker embedding in determining activations for layers of the machine learning model during the processing; generating, based on the processing and as direct output from the machine learning model, a predicted refined version of the audio data; generating a loss based on comparing the predicted refined version of the audio data to the instance of audio data that includes the spoken input from only the first human speaker; and updating one or more weights of the machine learning model based on the loss.

In addition, some implementations include one or more processors of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
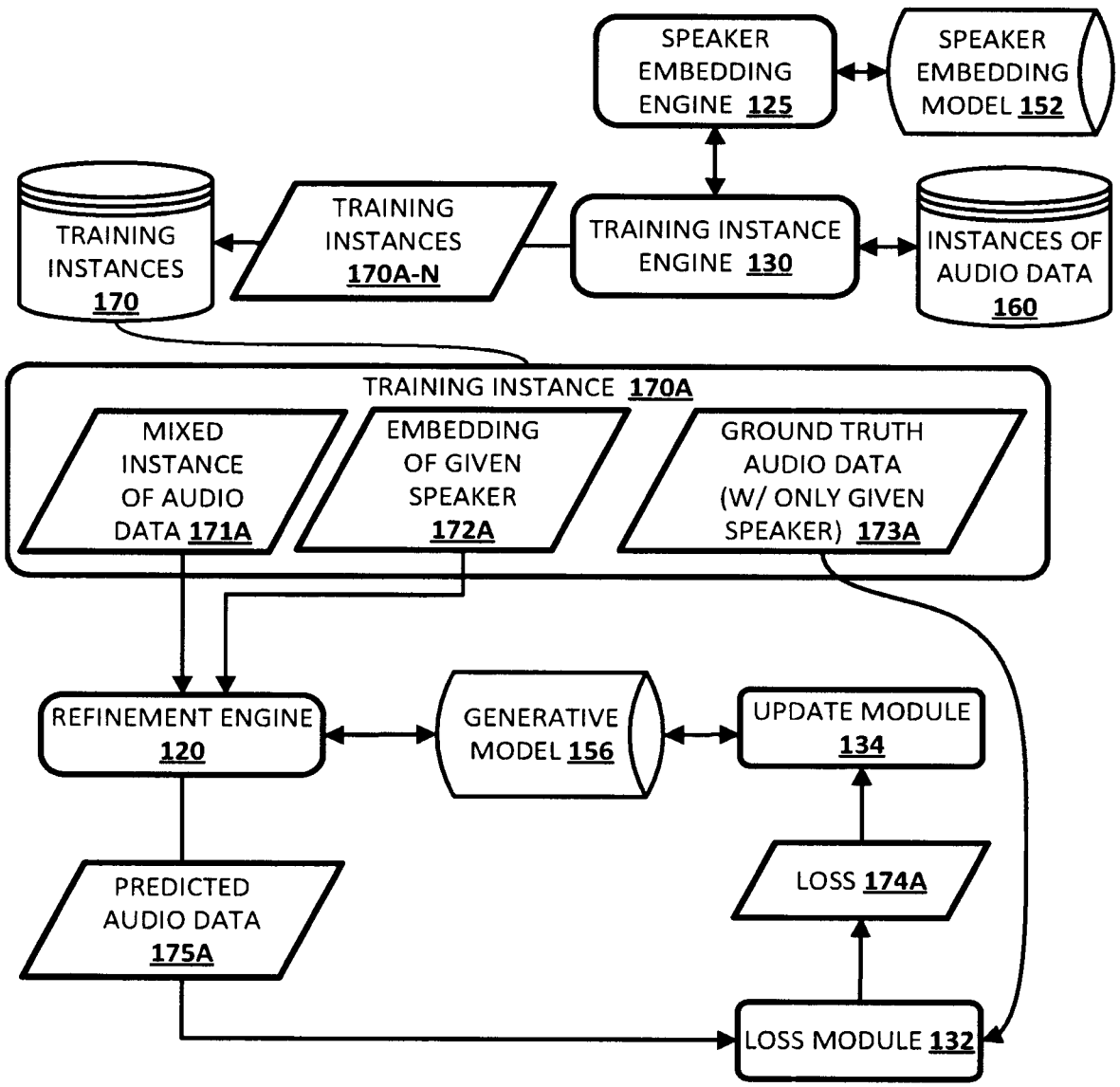
FIG. 1 illustrates an example of training a generative model according to various implementations disclosed herein.

Turning initially to FIG. 1, an example of training a generative model 156 is illustrated. The generative model 156 can be a sequence-to-sequence model, with hidden layers that include a stack of dilated causal convolutional layers. The stack of dilated causal convolutional layers enable receptive fields of the convolutional layers to grow exponentially with depth, which can be beneficial in modelling the long-range temporal dependencies in audio signals. In some implementations, the trained generative model has a WaveNet model architecture.

The generative model 156 is trained to be used to generate, based on processing audio data and a speaker embedding of a target human speaker, a refined version of the audio data that isolates utterance(s) (if any) of the target speaker. As described herein, the generative model 156 can be trained to accept, as input at each iteration, a respective sequence of the audio data for that iteration (where the number of time-steps of audio data in the sequence is dependent on the size of the receptive field of the generative model) and to be used to generate, as output at each iteration, a corresponding time-step of a sequence of the refined version of the audio data. The corresponding time-step of the sequence of the refined version of the audio data can be based on the corresponding time-step of the audio data, and preceding time-steps of the audio data captured in the receptive field, but will not be based on future time-steps of the audio data. As further described herein, the output is also generated using the speaker embedding of the target speaker. For example, activations for layers of the generative model 156 during processing of the sequence of the audio data can be based on the speaker embedding. Accordingly, generative model 156, once trained, can be used to generate, as direct output of the generative model 156, a refined version of audio data—and is used to generate the refined version based on processing of the audio data and a speaker embedding of a target speaker. The generative model 156 can accept the audio data in its raw waveform format, and can likewise generate refined audio data in a raw waveform format.

The trained generative model 156 can be trained to model the conditional distribution p(x|h), where x represents the refined version of the audio data, h represents a speaker embedding. More formally, p(x|h, s) can be represented as:

$$p(x|h) = \prod_{t=1}^{T} p(x_t | x_1, \ldots x_{t-1}, h),$$

where $x_1 \ldots x_{t-1}$ represents a sequence of T refined audio sample predictions (that can be conditioned on the source audio data), $x_t$ represents the next refined audio sample prediction (i.e., the next audio sample prediction for the refined version of the audio data), and h represents a speaker embedding and can be a vector of real values with a fixed-sized dimension. Moreover, in various implementations, the output filter at each of one or more layers of the trained generative model can be represented by:

$$z = \tan h(W_{f,k} * x + V_{f,k}^T h) \odot \sigma(W_{g,k} * x + V_{g,k}^T h)$$

where W represents a filter and V represents another filter.

Figure 10:
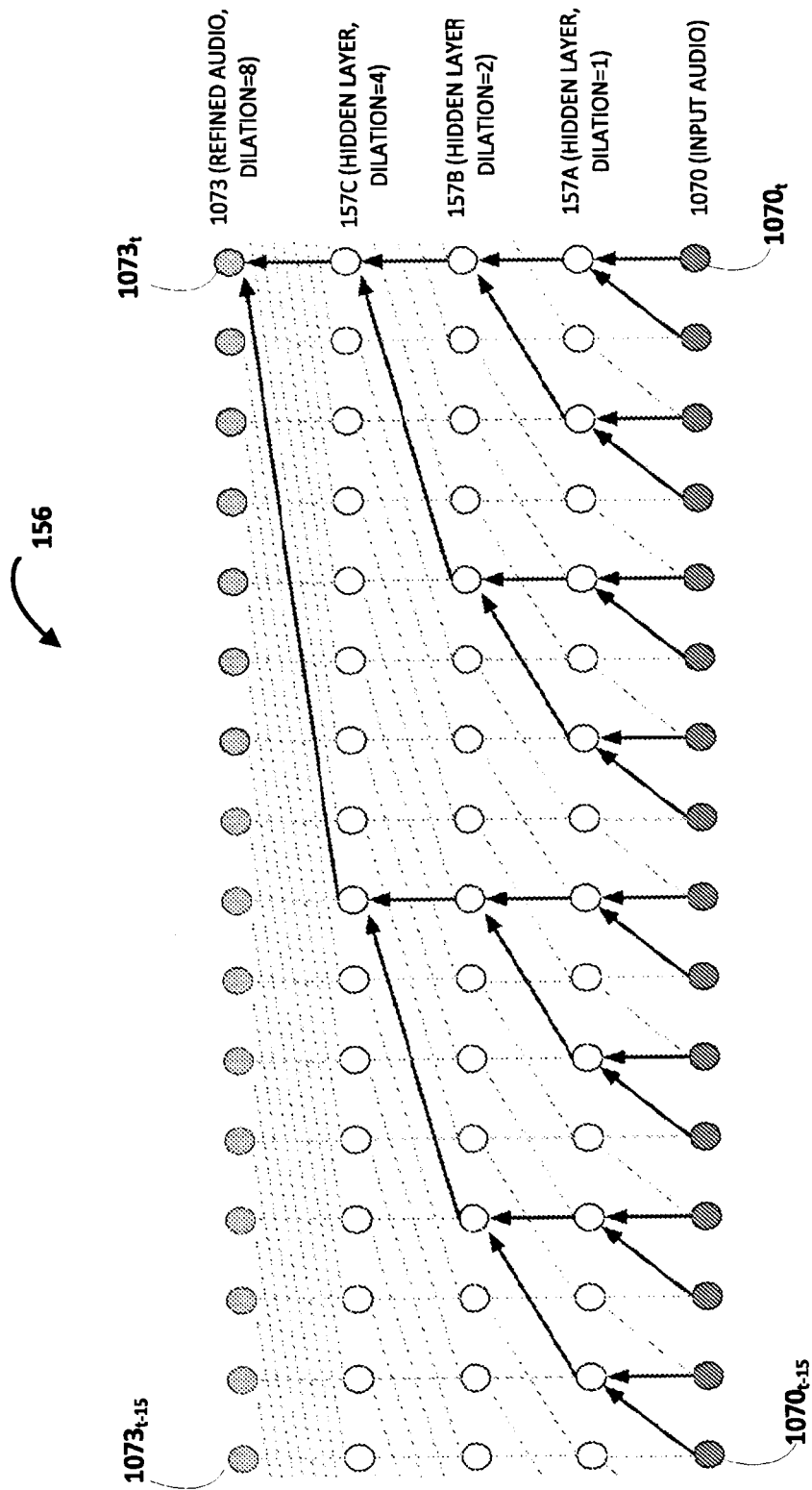
FIG. 10 illustrates an example of processing that can be performed by a trained generative model according to various implementations disclosed herein.

Turning to FIG. 10, an example of processing that can be performed by a trained generative model is illustrated. In FIG. 10, a current time-step $1070_t$ of input audio data 1070 (source audio data) is being processed over hidden layers 157A, 157B, and 157C of the trained generative model, along with the preceding fifteen time-steps of input audio data 1070 ($1070_{t-15}$ is the only one of the preceding that is numbered in FIG. 10 for simplicity) to directly generate a current time-step $1073_t$ of refined audio data. Due to the stacked causal convolutional nature of the layers 157A-C, the processing of the current time-step $1073_t$ of refined audio is influenced not only by the current time-step $1070_t$ of input audio 1070, but also by the processing of the preceding fifteen time-steps of input audio 1070. The influence of the preceding time-steps is a result of the increased receptive field provided by the stacked causal convolutional nature of the layers 157A-C, and the other solid arrows present a visualization of the influence the preceding fifteen time-steps of input audio data 1070 on generating the current time-step of refined audio data $1073_t$. Also illustrated in FIG. 10 are preceding fifteen time-steps of refined audio data 1073 ($1073_{t-15}$ is the only one of the preceding that is numbered in FIG. 10 for simplicity) generated in prior iterations of processing. Such preceding time-steps of refined audio data 1073 can likewise be influenced by prior processing of input audio 1070 that had occurred prior to generating those time-steps (the dashed lines represent such prior influence). As described herein, the processing performed using each of the hidden layers 157A-C can be influenced by the speaker embedding for which the refined audio data 1073 is being generated. For example, one or more of the filters modeled by such hidden layers 157A-C can be influenced by the speaker embedding. Although a specific example is illustrated in FIG. 10, variations are contemplated, such as variations with additional layers, larger receptive fields, etc.

Turning again to FIG. 1, also illustrated is a training instance engine 130 that generates a plurality of training instances 170A-N, that are stored in training instances database 170 for use in training the generative model 156. Training instance 170A is illustrated in detail in FIG. 1. The training instance 170A includes a mixed instance of audio data 171A, an embedding of a given speaker 172A, and ground truth audio data 173A (also referred to herein as "reference audio data") that is an instance of audio data with only utterance(s) from the given speaker corresponding to the embedding 172A.

The training instance engine 130 can generate the training instances 170A-N based on instances of audio data from instances of audio data database 160, and through interaction with speaker embedding engine 125. For example, the training instance engine 130 can retrieve the ground truth audio data 173A from the instances of audio data database 160—and use it as the ground truth audio data for the training instance 170A.

Further, the training instance engine 130 can provide the ground truth audio data 173A to the speaker embedding engine 125 to receive, from the speaker embedding engine 125, the embedding of the given speaker 172A. The speaker embedding engine 125 can process one or more segments of the ground truth audio data 173A using the speaker embedding model 152 to generate the embedding of the given speaker 172A. For example, the speaker embedding engine 125 can utilize a VAD to determine one or more segments of the ground truth audio data 173A that include voice activity, and determine the embedding of the given speaker 172A based on processing one or more of those segments using the speaker embedding model 152. For instance, all of the segments can be processed using the speaker embedding model 152, and the resulting final output generated based on the processing can be used as the embedding of the given speaker 172A. Also, for instance, a first segment can be processed using the speaker embedding model 152 to generate a first output, a second segment can be processed using the speaker embedding model 152 to generate a second output, etc.—and a centroid of the outputs utilized as the embedding of the given speaker 172A.

The training instance engine 130 generates the mixed instance of audio data 171A by combining the ground truth audio data 173A with an additional instance of audio data from the instances of audio data database 160. For example, the additional instance of audio data can be one that includes one or more other human speaker(s) and/or background noise.

Figure 2:
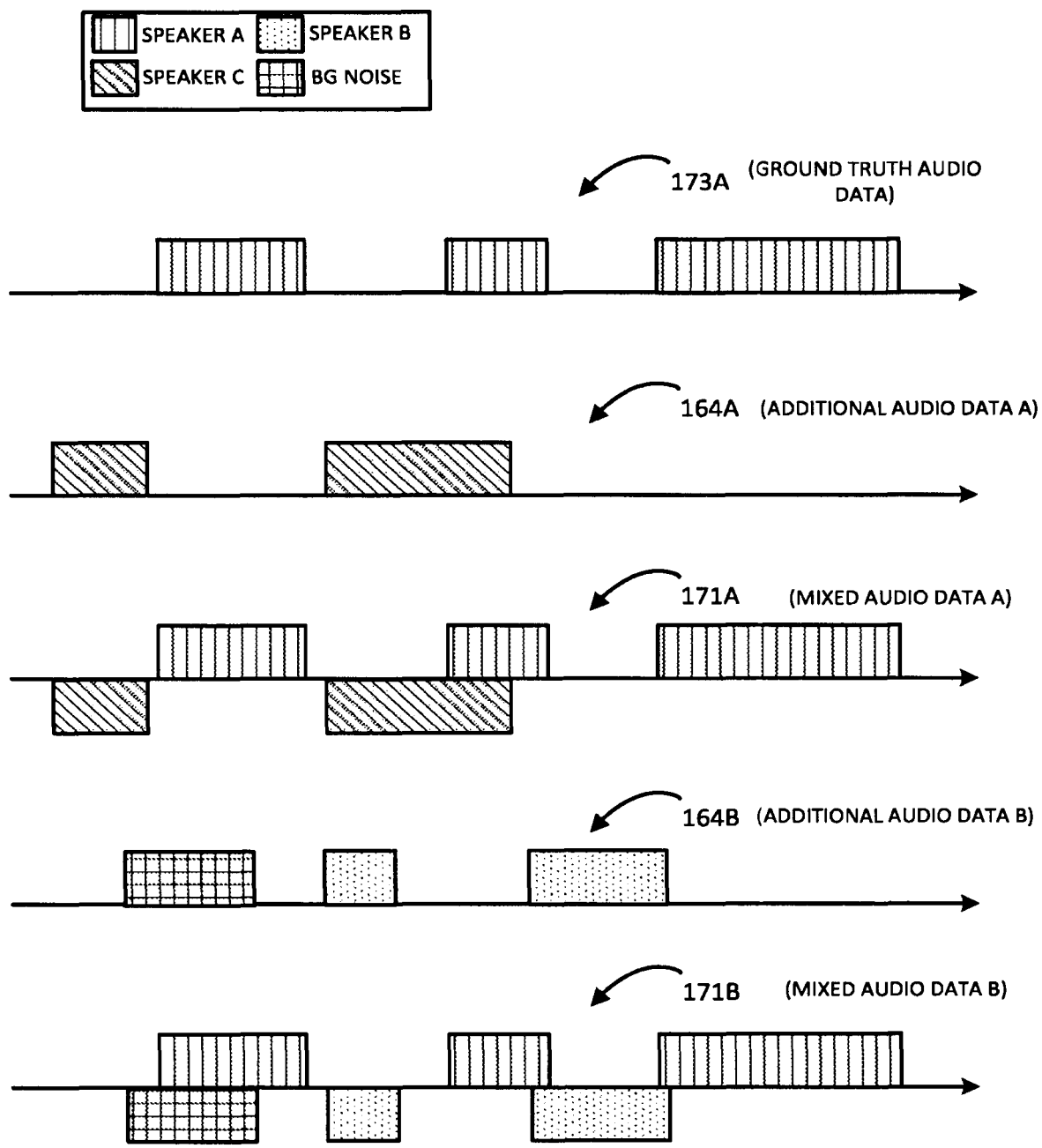
FIG. 2 illustrates examples of using ground truth audio data and additional audio data to generate mixed audio data for use in training instances used to train the generative model of FIG. 1.

Turning to FIG. 2, the ground truth audio data 173A is illustrated schematically. The arrow illustrates time and the three vertical shading areas in the ground truth audio data 173A represent segments of the audio data where "Speaker A" is providing a respective utterance. Notably, the ground truth audio data 173A includes no (or de minimis) additional sounds. As described above, the ground truth audio data can be utilized in the training instance 170A. Further, the embedding of the given speaker 172A in the training instance 170A can be generated based on processing, by the speaker embedding engine 125, of one or more segments of the ground truth audio data 173A.

Also illustrated schematically in FIG. 2 is additional audio data A 164A, which can be retrieved from instances of audio data database 160 (FIG. 1). The arrow illustrates time and the two diagonal shaded areas in additional audio data A 164A represent segment(s) of the audio data where "Speaker C" is providing a respective utterance. Notably, "Speaker C" is different from "Speaker A" that provides the utterances in ground truth audio data 173A.

Also illustrated schematically in FIG. 2 is mixed audio data A 171A, which is generated by combining ground truth audio data 163A and additional audio data A 164A. Mixed audio data A 171A includes the shaded areas from ground truth audio data 173A (vertical shading) and the shaded areas from additional audio data A 164A (diagonal shading). Accordingly, in mixed audio data A 171A, both "Speaker A" and "Speaker C" utterances are included, and part of a "Speaker A" utterance overlaps with a part of a "Speaker B" utterance. As described above, the mixed audio data A 171A can be utilized in the training instance 170A.

Further, an additional training instance, of training instances 170A-N, can be generated that includes the embedding of the given speaker 172A, the ground truth audio data 173A, and mixed audio data B 171B. Mixed audio data B 171B is illustrated schematically in FIG. 2 and is generated by combining ground truth audio data 163A and additional audio data B 164B. Additional audio data B 164B includes utterances from "Speaker B" (stippling shading) and includes background noise (hatched shading). Mixed audio data B 171B includes the shaded areas from ground truth audio data 173A (vertical shading) and the shaded areas from additional audio data A 164B (stippling shading and hatch shading). Accordingly, in mixed audio data B 171B, both "Speaker A" and "Speaker B" utterances are included, as well as "background noise". Further, parts of "Speaker A" utterances overlap with the "background noise" and with parts of a "Speaker B" utterance.

Although only two training instances are described with respect to FIG. 2, it is understood that many more training instances can be generated. For example, additional training instances can be generated that utilize ground truth audio data 173A (e.g., by generating additional mixed audio data based on additional audio data instances). Also, for example, additional training instances can be generated that each utilize alternative ground truth audio data (that each include an alternative speaker) and that each include an alternative speaker embedding (that corresponds to the alternative speaker of the ground truth audio data).

In training the generative model 156 based on the training instance 170A, the refinement engine 120 sequentially applies the mixed instance of audio data 171A as input to the generative model 156, utilizing the embedding of the given speaker 172A in determining activations for layers of the generative model 156, to sequentially generate time-steps of predicted audio data 175A. For example, the refinement engine 120 can apply a first time-step of the mixed instance of audio data 171A as input to the generative model 156 at an initial iteration and generate, based on processing the input over the model 156 (and based on the embedding 172A), a first time step of predicted audio data. Continuing with the example, the refinement engine 120 can next apply the first time-step and the second time-step of the mixed instance of audio data 171A as input to the generative model 156 at a second iteration and generate, and generate, based on processing the input over the model 156 (and based on the embedding 172A), a second time step of predicted audio data. This can continue until all time steps of the mixed instance of audio data 171A are processed (with later iterations including a current time-step of the audio data and up to N preceding time-steps, where N is dependent on the receptive field of the model 156).

The loss module 132 generates a loss 174A as a function of: the predicted audio data 175A and the ground truth audio data 173A. The loss 174A is provided to the update module 134, which updates the generative model 156 based on the loss. For example, the update module 134 can update the causal convolutional layers of the generative model 156 (that model the filters in the equation above) based on the loss and using backpropagation (e.g., gradient descent).

While FIG. 1 only illustrates a single training instance 170A in detail, it is understood that training instances database 170 can include a large quantity of additional training instances. The additional training instances can include training instances of various lengths (e.g., based on various durations of audio data), training instances with various ground truth audio data and speaker embeddings, and training instances with various additional sounds in the respective mixed instances of audio data. Moreover, it is understood that a large quantity of the additional training instances will be utilized to train generative model 156.

Figure 3:
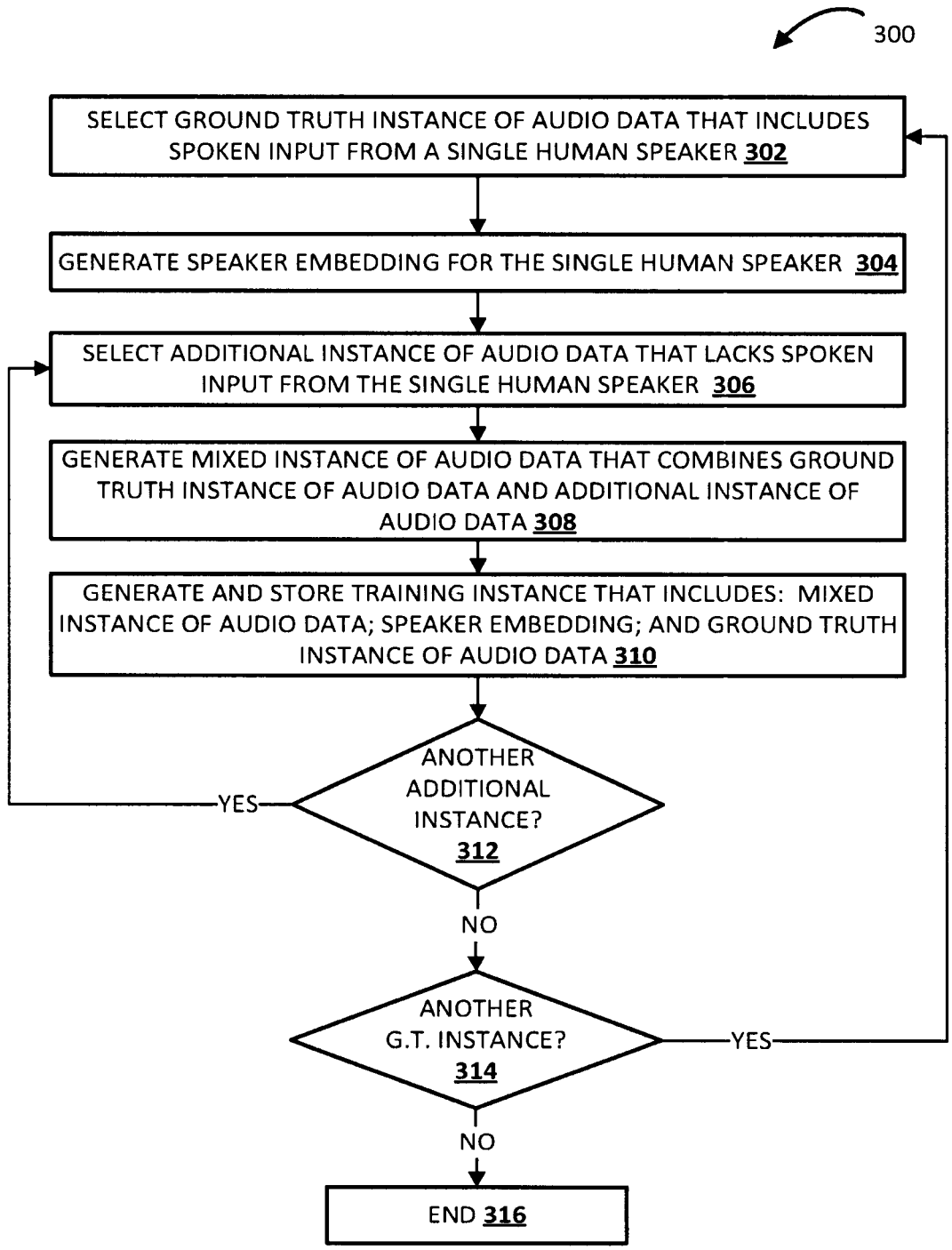
FIG. 3 depicts a flowchart illustrating an example method of generating training instances, for training a generative model, according to various implementations disclosed herein.

Turning now to FIG. 3, an example method 300 is illustrated of generating training instances, for training a generative model, according to various implementations disclosed herein. For convenience, the operations of the flow chart of FIG. 3 are described with reference to a system that performs the operations. This system may include various components of various computer systems, such as training instance engine 130 and/or one or more GPU(s), CPU(s), and/or TPU(s). Moreover, while operations of method 300 are shown in a particular order, this is not meant to be limiting. One or more operations may be reordered, omitted or added.

At block 302, the system selects a ground truth instance of audio data that includes spoken input from a single human speaker.

At block 304, the system generates a speaker embedding for the single human speaker. For example, the speaker embedding can be generated by processing one or more segments of the ground truth instance of audio data, using a speaker embedding model.

At block 306, the system selects an additional instance of audio data that lacks spoken input from the single human speaker. For example, the additional instance of audio data can include spoken input from other speaker(s) and/or background noise (e.g., music, sirens, air conditioning noise, etc.).

At block 308, the system generates a mixed instance of audio data that combines the ground truth instance of audio data and the additional instance of audio data.

At block 310, the system generates and stores a training instance that includes: the mixed instance of audio data, the speaker embedding, and the ground truth instance of audio data.

At block 312, the system determines whether to generate an additional training instance using the same ground truth instance of audio data and the same speaker embedding, but a different mixed instance of audio data that is based on another additional instance. If so, the system proceeds back to block 306 and selects a different additional instance, proceeds to block 308 and generates another mixed instance of audio data that combines the same ground truth instance of audio data and the different additional instance, then proceeds to block 310 and generates and stores a corresponding training instance.

If, at an iteration of block 312, the system determines not to generate an additional training instance using the same ground truth instance of audio data and the same speaker embedding, the system proceeds to block 314 and determines whether to generate an additional training instance using another ground truth instance of audio data. If so, the system performs another iteration of blocks 302, 304, 306, 308, 310, and 312 utilizing a different ground truth instance of audio data with a different human speaker, utilizing a different speaker embedding for the different human speaker, and optionally utilizing a different additional instance of audio data.

If, at an iteration of block 314, the system determines not to generate an additional training instance using another ground truth instance of audio data, the system proceeds to block 316 and generating of training instances ends.

Figure 4:
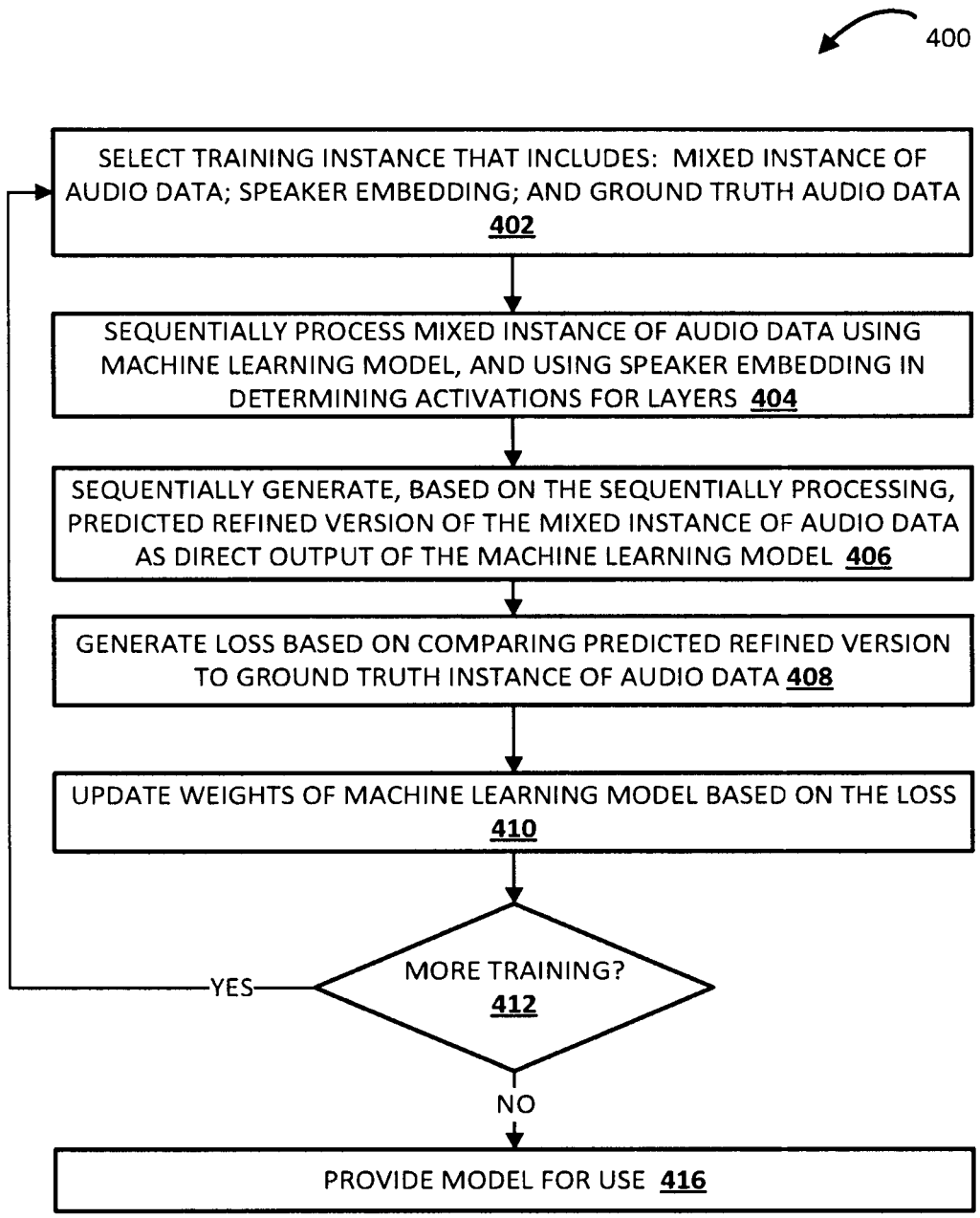
FIG. 4 depicts a flowchart illustrating an example method of training a generative model according to various implementations disclosed herein.

Turning now to FIG. 4, an example method 400 is illustrated of training a generative model according to various implementations disclosed herein. For convenience, the operations of the flow chart of FIG. 4 are described with reference to a system that performs the operations. This system may include various components of various computer systems, such as refinement engine 120 and/or one or more GPU(s), CPU(s), and/or TPU(s). Moreover, while operations of method 400 are shown in a particular order, this is not meant to be limiting. One or more operations may be reordered, omitted or added.

At block 402, the system selects a training instance that includes a mixed instance of audio data, a speaker embedding, and ground truth audio data. For example, the system can select a training instance generated according to method 300 of FIG. 3.

At block 404, the system sequentially processes the mixed instance of audio data using a machine learning model (e.g., generative model 156), and using the speaker embedding in determining activations for layers of the machine learning model.

At block 406, the system sequentially generates, based on the sequentially processing of block 404, predicted refined versions of the mixed instance of audio data as direct output of the machine learning model.

At block 408, the system generates a loss based on comparing the predicted refined version of the mixed instance of audio data, to the ground truth instance of audio data.

At block 410, the system updates weights of the machine learning model based on the generated loss.

At block 412, the system determines whether to perform more training of the machine learning model. If so, the system proceeds back to block 402, selects an additional training instance, then performs an iteration of blocks 404, 406, 408, and 410 based on the additional training instance, then performs an additional iteration of block 412. In some implementations, the system can determine to perform more training if there are one or more additional unprocessed training instances and/or if other criterion/criteria are not yet satisfied. The other criterion/criteria can include, for example, whether a threshold number of epochs have occurred and/or a threshold duration of training has occurred. Although method 400 is described with respect to a non-batch learning technique, batch learning may additionally and/or alternatively be utilized.

If, at an iteration of block 412, the system determines not to perform more training, the system can proceed to block 416 where the system considers the machine learning model trained, and provides the machine learning model for use. For example, the system can provide the trained machine learning model for use in one or both of methods 600 (FIG. 6A) and 700 (7A) described herein.

Figure 5:
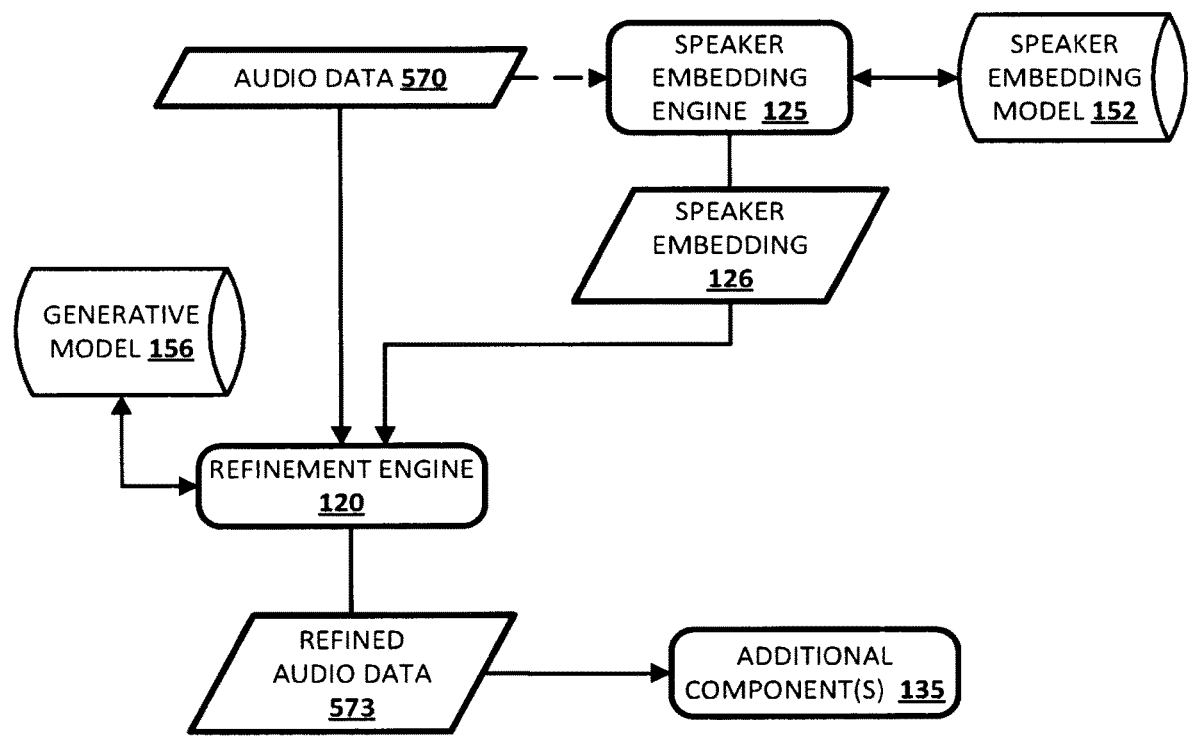
FIG. 5 illustrates an example of generating a refined version of audio data, using the audio data, a speaker embedding, and a generative model.

FIG. 5 illustrates an example of generating a refined version of audio data, using the audio data, a speaker embedding, and a generative model. The generative model 156 can be the same as the generative model 156 of FIG. 1, but has been trained (e.g., trained as described with respect to FIG. 1 and/or FIG. 3).

In FIG. 5, the refinement engine 120 receives a sequence of audio data 570. The audio data 570 can be, for example, streaming audio data that is processed in an online manner (e.g., in real-time or in near real-time) or non-streaming audio data that has been previously recorded and provided to refinement engine 120. The refinement engine 120 also receives a speaker embedding 126 from speaker embedding engine 125. The speaker embedding 126 is an embedding for a given human speaker, and the speaker embedding engine 125 can generate the speaker embedding 126 based on processing one or more instances of audio data, from the given speaker, using the speaker embedding model 152. As described herein, in some implementations, the speaker embedding 126 is previously generated by the speaker embedding engine 125 based on previous instance(s) of audio data from the given speaker. In some of those implementations, the speaker embedding 126 is associated with an account of the given speaker and/or a client device of the given speaker, and the speaker embedding 126 can be provided for utilization with the audio data 570 based on the audio data 570 coming from the client device and/or from a digital system where the account has been authorized. As also described herein, in some implementations, the speaker embedding 126 is generated by the speaker embedding engine 125 based on the audio data 570 itself. For example, VAD can be performed on the audio data 570 to determine a first instance of voice activity in the audio data, and portion(s) of the first instance can be utilized by the speaker embedding engine 125 in generating the speaker embedding 126.

The refinement engine 120 sequentially applies the of audio data 570 as input to the generative model 156, utilizing the speaker embedding 126 in determining activations for layers of the generative model 156, to sequentially generate time-steps of refined audio data 573. The refined audio data 573 can: be the same as the audio data 570 when the audio data 570 includes only utterance(s) from the speaker corresponding to the speaker embedding 126; be null/zero when the audio data 570 lacks any utterances from the speaker corresponding to the speaker embedding 126; or exclude additional sound(s) while isolating utterance(s) from the speaker corresponding to the speaker embedding 126, when the audio data 570 includes utterance(s) from the speaker and additional sound(s) (e.g., overlapping utterance(s) of other human speaker(s)).

The refinement engine 120 then provides the refined audio data 573 to one or more additional component(s) 135. Although FIG. 5 illustrates generating a single instance of refined audio data 573 based on a single speaker embedding 126, it is understood that in various implementations multiple instances of refined audio data can be generated, with each instance being based on the audio data 570 and a unique speaker embedding for a unique human speaker.

As mentioned above, the refinement engine 120 provides the refined audio data 573 to one or more additional component(s) 135. In some implementations, the refinement engine 120 provides the refined audio data 573 in an online manner (e.g., part of the refined audio data 573 can be provided while the remaining part is still being generated). In some implementations, the additional component(s) 135 include a client device or other computing device (e.g., a server device) and the audio data 570 is received as part of a speech processing request submitted by the computing device (or related computing device(s)). In those implementations, the refined audio data 573 is generated in response to receiving the speech processing request, and is transmitted to the computing device in response to receiving the speech processing request. Optionally, other (unillustrated) speech processing can additionally be performed in response to the speech processing request (e.g., voice-to-text processing, natural language understanding), and the results of such speech processing additionally or alternatively be transmitted in response to the request.

In some implementations, the additional component(s) 135 include one or more components of an automated assistant, such as an automatic speech recognition (ASR) component (e.g., that performs voice-to-text conversion) and/or a natural language understanding component. For example, the audio data 570 can be streaming audio data that is based on output from one or more microphones of a client device that includes an automated assistant interface for interfacing with the automated assistant. The automated assistant can include (or be in communication with) the refinement engine 120, and transmitting the refined audio data 573 can include transmitting it to one or more other components of the automated assistant.

Turning now to FIGS. 6A, 6B, 7A, and 7B, additional description is provided of generating refined version(s) of audio data and utilizing such refined version(s).

Figure 6A:
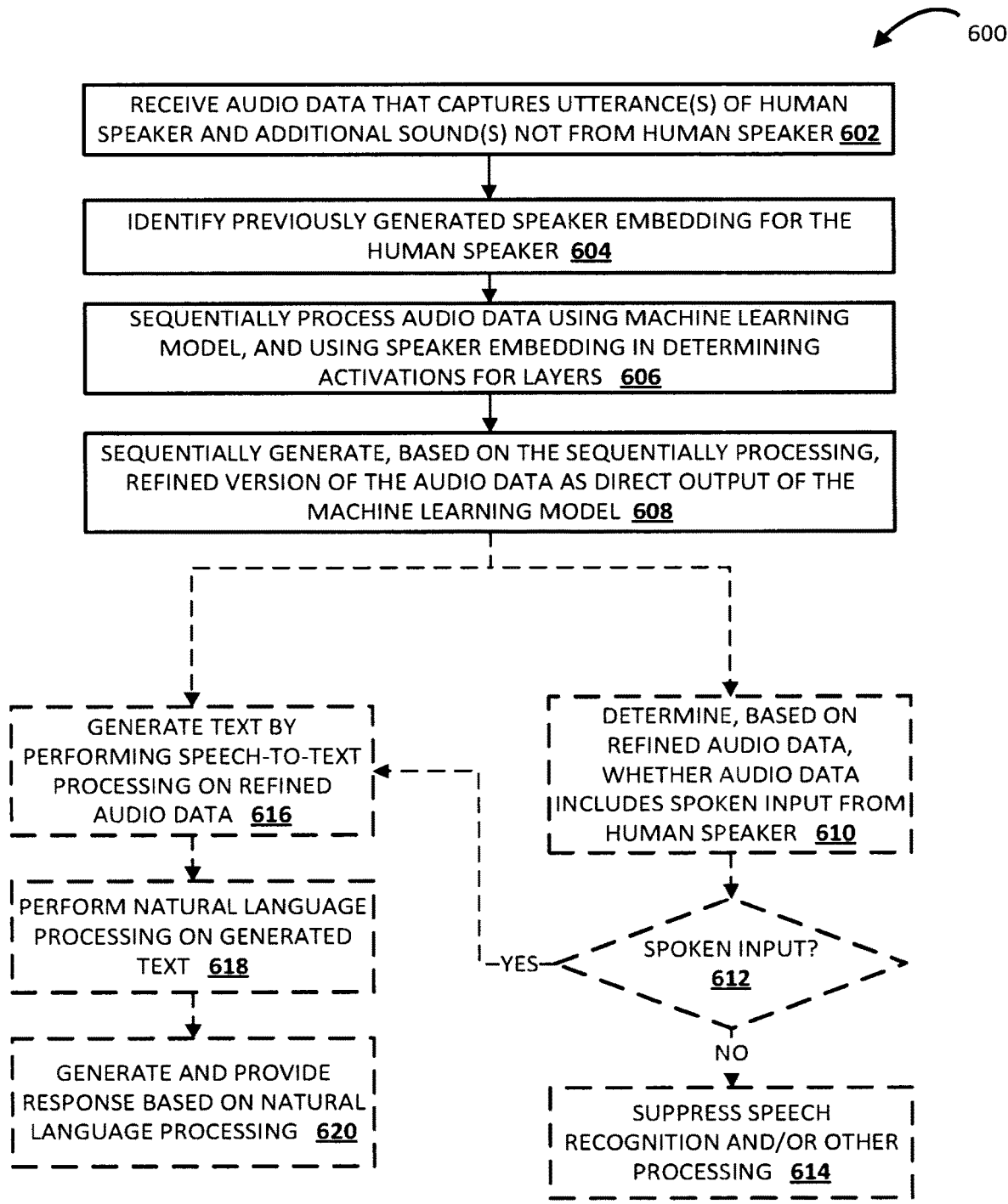
FIG. 6A depicts a flowchart illustrating an example method of generating a refined version of audio data, using the audio data, a speaker embedding, and a generative model, according to various implementations disclosed herein.
Figure 6B:
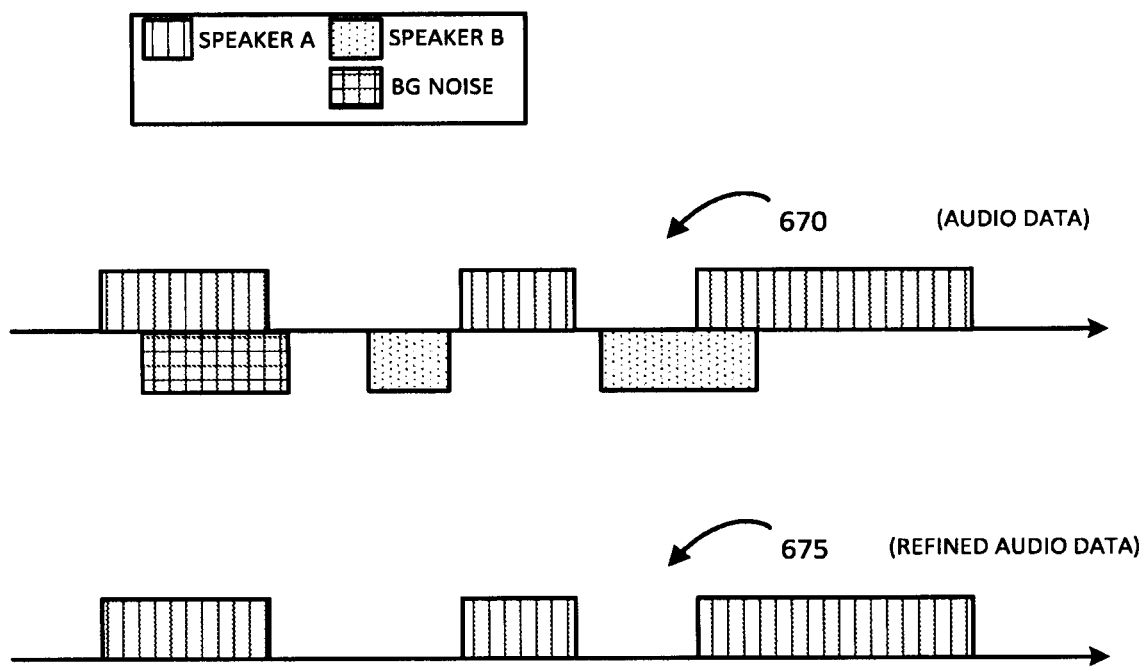
FIG. 6B illustrates an example of audio data, and a refined version of the audio data that can be generated based on the example method of FIG. 6A.

FIG. 6A illustrates an example method 600 of generating refined version of audio data, using the audio data, a speaker embedding, and a generative model, according to various implementations disclosed herein. For convenience, the operations of certain aspects of the flow chart of FIG. 6A are described with reference to the audio data 670 and refined audio data 675 that are schematically represented in FIG. 6B. Also, for convenience, the operations of the flow chart of FIG. 6A are described with reference to a system that performs the operations. This system may include various components of various computer systems, such as speaker embedding engine 125, refinement engine 120, and/or one or more GPU(s), CPU(s), and/or TPU(s). In various implementations, one or more blocks of FIG. 6A may be performed by a client device using a speaker embedding and a machine learning model stored locally at the client device. Moreover, while operations of method 600 are shown in a particular order, this is not meant to be limiting. One or more operations may be reordered, omitted or added.

At block 602, the system receives audio data that captures utterance(s) of a human speaker and additional sound(s) that are not from the human speaker. In some implementations, the audio data is streaming audio data. As one example, at block 602 the system can receive the audio data 670 of FIG. 6B, which includes utterances from "Speaker A" (vertical shading), as well as utterances from "Speaker B" (stippling shading) and "background noise" (hatched shading).

At block 604, the system selects a previously generated speaker embedding for the human speaker. For example, the system can select a previously generated speaker embedding for "Speaker A". For instance, the speaker embedding could have been previously generated based on an immediately preceding utterance, from "Speaker A", that was received at the client device that generated the audio data—and can be selected based on "Speaker A" being the speaker of the immediately preceding utterance. Also, for instance, the speaker embedding could have been previously generated during an enrollment process performed by "Speaker A" for an automated assistant, client device, and/or other digital system. In such an instance, the speaker embedding can be selected based on the audio data being generated by the client device and/or via an account of "Speaker A" for the digital system. As one particular instance, audio data received at block 602 can be determined to be from "Speaker A" based on "Speaker A" being recently verified as an active user for the digital system. For example, voice fingerprinting, image recognition, a passcode, and/or other verification may have been utilized to determine "Speaker A" is currently active and, as a result, the speaker embedding for "Speaker A" can be selected.

At block 606, the system sequentially processes audio data using a machine learning model (e.g., generative model 156), and using the speaker embedding in determining activations for layers of the machine learning model.

At block 608, the system sequentially generates, based on the sequentially processing of block 606, a refined version of the audio data as direct output of the machine learning model. For example, the system can generate the refined audio data 675 schematically illustrated in FIG. 6B, in which only the utterances of "Speaker A" remain.

The system then optionally performs optional blocks 610, 612, and 614 and/or optional blocks 616, 618, and/or 620.

At block 610, the system determines, based on the refined audio data generated at block 608, whether the audio data includes spoken input from the human speaker corresponding to the speaker embedding of block 604. For example, if the refined audio data is null/zero (e.g., all audio data is less than a threshold level), then the system can determine the audio data does not include any spoken input from the human speaker corresponding to the speaker embedding. On the other hand, if the refined audio data includes one or more non-null segments (e.g., exceeding a threshold level), the system can determine the audio data does include spoken input from the human speaker corresponding to the speaker embedding.

If, at an iteration of block 610, the system determines the audio data does not include any spoken input from the human speaker corresponding to the speaker embedding, the system at block 612 determines to proceed to block 614 and suppress ASR and/or other processing of the audio data, and of the refined audio data. Accordingly, in those implementations resources are not needlessly consumed in performing the ASR and/or other processing, such as computational resources that would be consumed in performance of the ASR and/or other processing and/or network resources utilized to transmit the audio data (or refined audio data) when the ASR and/or other processing is performed by remote system(s).

In some implementations, blocks 610, 612, and 614 can be performed in various situations to ensure that any spoken input in received audio data is from a particular human speaker, before performing various processing on such audio data (e.g., ASR and/or intent determination) and/or before transmitting such audio data from a device at which it is initially generated. In addition to computational resource and network resource savings, this can also promote privacy of audio data that is not from a particular human speaker and not intended for further processing by an automated assistant and/or other digital system. In some of those implementations, blocks 610, 612, and 614 can be performed at least when a client device that receives the audio data receives the audio data when in a continued listening mode. For example, the device can be in a continued listening mode after the particular human speaker previously explicitly invoked an automated assistant via the client device, provided spoken input, and received responsive content from automated assistant. For instance, the automated assistant can continue to perform limited processing of audio data, for a duration of time after providing at least part of the responsive content. In those implementations, the limited processing can include (or be restricted to) blocks 602, 604, 606, 608, 610, 612, and 614, and can be performed to ensure that further processing of the audio data is only performed responsive to a "yes" determination at block 612. For example, the speaker embedding of block 604 can be an embedding for the particular human speaker based on the particular human speaker having previously explicitly invoked the automated assistant, thereby ensuring that further processing is only performed if that same particular human speaker provides a further utterance. This can prevent waste of resources as described above, and further prevent errant actions from being taken based on utterance(s) from other human speaker(s) that may be captured by the audio data (e.g., other human speaker(s) co-present with the particular human speaker, other human speaker(s) on a television or radio that are captured in the audio data, etc.).

At block 616, the system generates text by performing speech-to-text processing on the refined audio data. As mentioned above, block 616 can, in some implementations, be performed following block 608 or, in some implementations, only performed after performance of block 610 and a "yes" determination at block 612.

At block 618, the system performs natural language processing (NLP) on the text generated at block 616. For example, the system can perform NLP to determine an intent of the text (and resultantly of the human speaker's utterance) and optionally one or more parameters for the intent.

At block 620, the system generates and provides a response based on the NLP of block 620. For example, if the text is "weather in Los Angeles", the intent from the NLP can be "weather forecast" with a location parameter of "Los Angeles, Calif.", and the system can provide a structured request, to a remote system, for the weather forecast in Los Angeles. The system can receive a response in response to the structured request, and provide the response for audible and/or visual rendering response to the utterance of the human speaker.

Figure 7A:
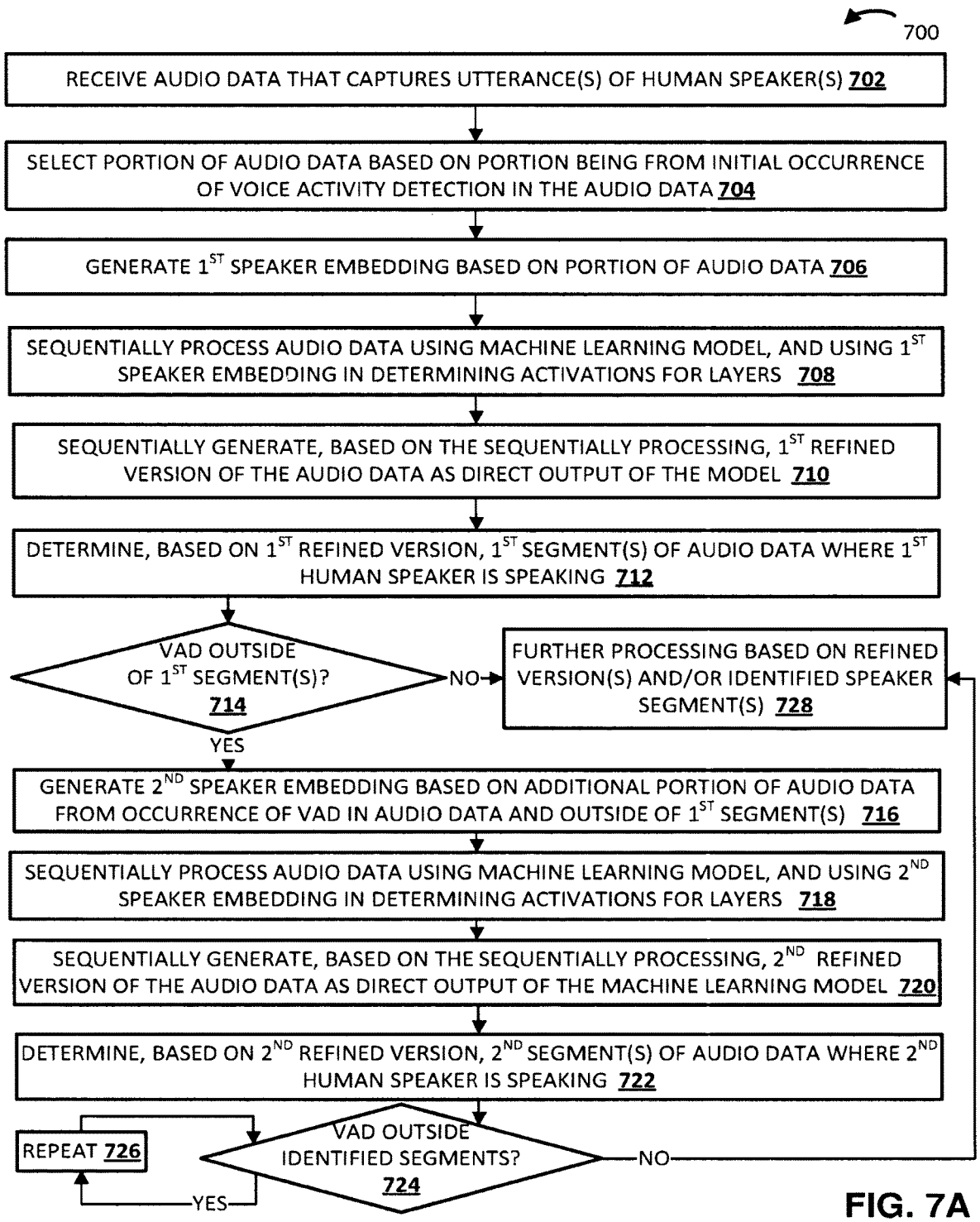
FIG. 7A depicts a flowchart illustrating an example method of generating multiple refined versions of audio data, using the audio data, speaker embeddings, and a generative model, according to various implementations disclosed herein.
Figure 7B:
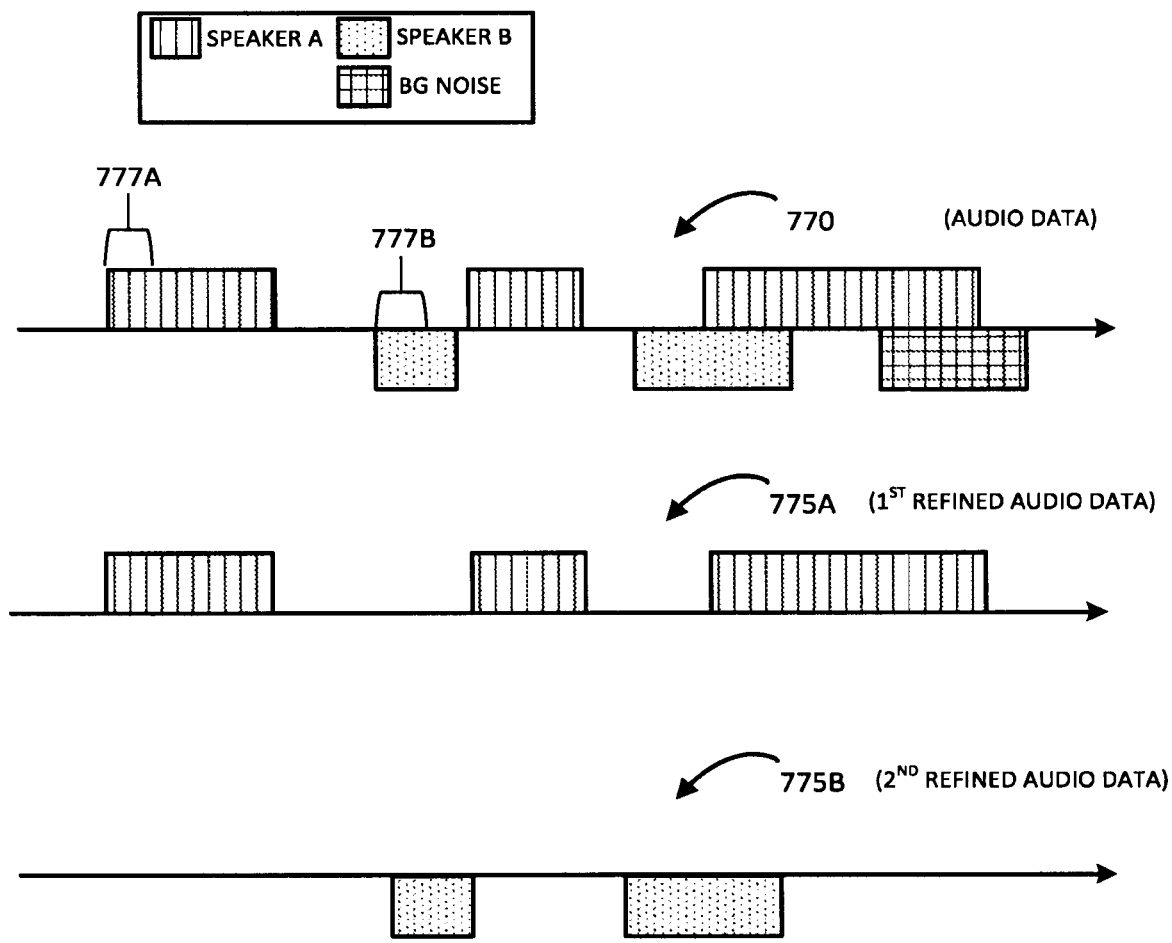
FIG. 7B illustrates an example of audio data, and refined versions of the audio data that can be generated based on the example method of FIG. 7B.

FIG. 7A illustrates an example method 700 of generating multiple refined versions of audio data, using the audio data, speaker embeddings, and a generative model, according to various implementations disclosed herein. For convenience, the operations of certain aspects of the flow chart of FIG. 7A are described with reference to the audio data 770, first refined audio data 775A, and second refined audio data 775B that are schematically represented in FIG. 7B. Also, for convenience, the operations of the flow chart of FIG. 7A are described with reference to a system that performs the operations. This system may include various components of various computer systems, such as speaker embedding engine 125, refinement engine 120, and/or one or more GPU(s), CPU(s), and/or TPU(s). In various implementations, one or more blocks of FIG. 7A may be performed by a client device using a speaker embedding and a machine learning model stored locally at the client device. Moreover, while operations of method 700 are shown in a particular order, this is not meant to be limiting. One or more operations may be reordered, omitted or added.

At block 702, the system receives audio data that captures utterance(s) of one or more human speakers. As one example, at block 702 the system can receive the audio data 770 of FIG. 7B, which includes utterances from "Speaker A" (vertical shading), as well as utterances from "Speaker B" (stippling shading) and "background noise" (hatched shading).

At block 704, the system selects a portion of the audio data based on the portion being from an initial occurrence of voice activity detection in the audio data. For example, the system can select portion 777A of audio data 770 of FIG. 7B, based on portion 777A being from the first segment of voice activity (i.e., the first utterance of "Speaker A").

At block 706, the system generates a first speaker embedding based on the portion of the audio data selected at block 704. For example, the system can generate the first speaker embedding based on processing the portion 777A (FIG. 7B) using a trained speaker embedding model.

At block 708, the system sequentially processes the audio data using a machine learning model (e.g., generative model 156), and using the first speaker embedding in determining activations for layers of the machine learning model.

At block 710, the system sequentially generates, based on the sequentially processing of block 708, a first refined version of the audio data as direct output of the machine learning model. For example, the system can generate the first refined audio data 775A schematically illustrated in FIG. 7B, in which only the utterances of "Speaker A" remain.

At block 712, the system determines, based on the first refined version of audio data, segment(s) of the audio data where the first human speaker is speaking. For example, the system can determine that the non-null segment(s) of first refined audio data 775A correspond temporally to respective segment(s) of the audio data where the first human speaker is speaking.

At block 714, the system determines if there are one or more occurrences of voice activity detection outside of those segment(s) of the audio data where the first human speaker is speaking. If not, the system can proceed to block 728 (described in more detail below). If so, the system can proceed to block 716. For example, for the audio data 770 (FIG. 7B), the system at block 714 can determine there is an occurrence of voice activity detection outside the segment(s) where the first human speaker is speaking, such as the portions of "Speaker B" utterances that do not overlap with "Speaker A" utterances.

At block 716, the system generates a second speaker embedding based on an additional portion of audio data that is from an occurrence of voice activity detection in audio data outside of the first segments. For example, the system can select portion 777B of audio data 770 of FIG. 7B, based on portion 777B being from an occurrence of voice activity, and being outside of the first segments (where the first segment(s) are determined based on the first refined audio data 775A as described above). Further, for example, the system can generate a second speaker embedding based on the portion 777B (e.g., using a speaker embedding model).

At block 718, the system sequentially processes the audio data using the machine learning model (e.g., generative model 156), and using the second speaker embedding in determining activations for layers of the machine learning model.

At block 720, the system sequentially generates, based on the sequentially processing of block 718, a second refined version of the audio data as direct output of the machine learning model. For example, the system can generate the second refined audio data 775B schematically illustrated in FIG. 7B, in which only the utterances of "Speaker B" remain.

At block 722, the system determines, based on the second refined version of audio data, segment(s) of the audio data where the second human speaker is speaking. For example, the system can determine that the non-null segment(s) of second refined audio data 775B correspond temporally to respective segment(s) of the audio data where the second human speaker is speaking.

At block 724, the system determines if there are one or more occurrences of voice activity detection outside of those segments where the first human speaker is speaking and outside of those segments where the second human speaker is speaking. If not, the system can proceed to block 728 (described in more detail below). If so, the system can proceed to block 726 and repeat a variant of blocks 716, 718, 720, 722, and 724 (where, in the variant, a third speaker embedding and third refined version of the audio data are generated). This can continue until a "no" determination is made at block 724. As an example of block 724, for the audio data 770 (FIG. 7B), the system at block 724 can determine there is not any occurrence of voice activity detection outside the segment(s) where the first human speaker is speaking and the second speaker is speaking, since there are no other utterances from other human speaker(s) (just background noise). Accordingly, in such an example the system can proceed to block 728 at a first iteration of block 724.

At block 728, the system performs further processing based on one or more of the generated refined versions of the audio data (e.g., first refined version, second refined version, additional refined version(s)) and/or based on the identified speaker segment(s) (i.e., the identification of which speakers correspond to which temporal segments of the audio data). In some implementations, block 728 includes transmitting refined version(s) of the audio data and/or an indication of the identified speaker segment(s) to one or more remote systems. In some implementations, block 728 additionally or alternatively includes performing ASR, NLP, and/or other processing. In some versions of those implementations, ASR is performed, the audio data is from audiovisual content, and block 728 includes generating temporally synchronized closed captioning for the audiovisual content.

Figure 8:
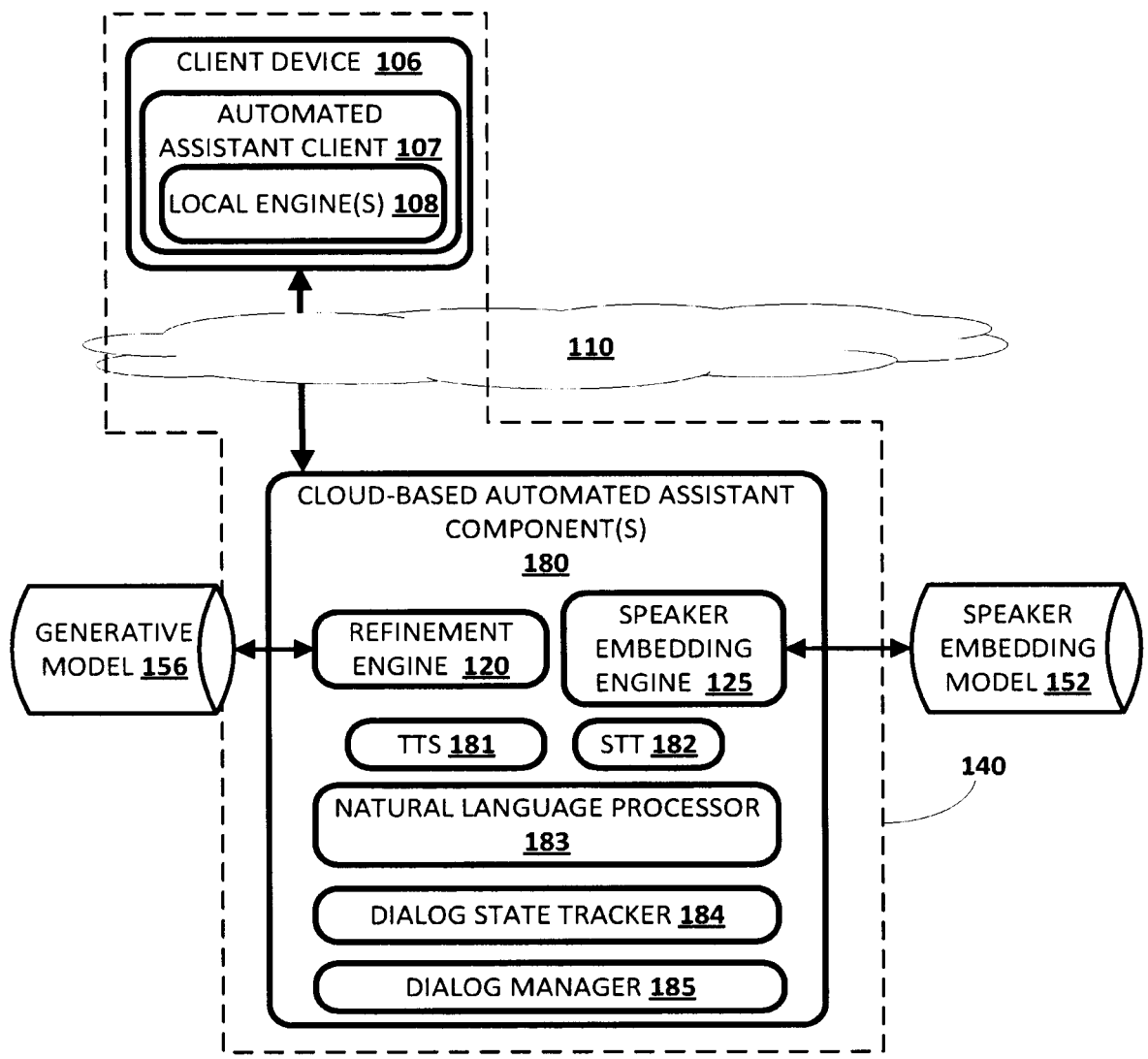
FIG. 8 is a block diagram of an example environment where various implementations disclosed herein can be performed.
Figure 9:
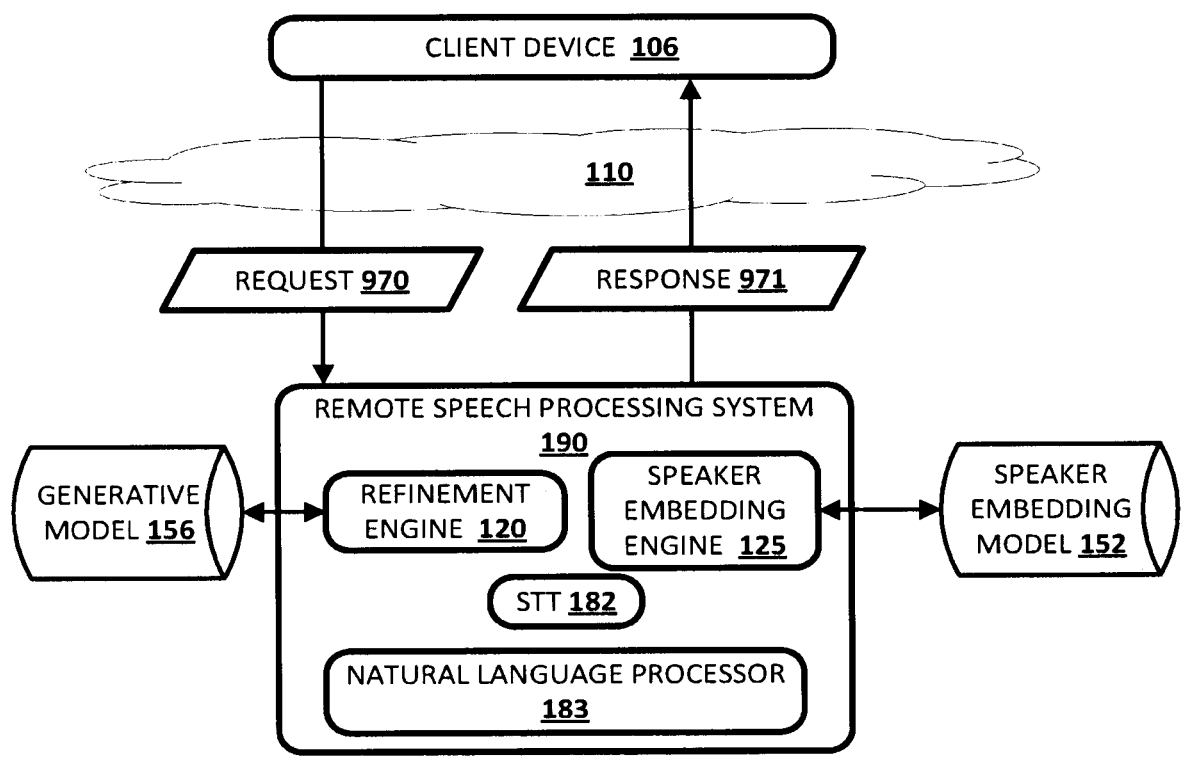
FIG. 9 is a block diagram of another example environment where various implementations disclosed herein can be performed.

Turning now to FIG. 8 and FIG. 9, two example environments are illustrated where various implementations can be performed. FIG. 8 is described initially, and includes a client computing device 106, which executes an instance of an automated assistant client 107. One or more cloud-based automated assistant components 180 can be implemented on one or more computing systems (collectively referred to as a "cloud" computing system) that are communicatively coupled to client device 106 via one or more local and/or wide area networks (e.g., the Internet) indicated generally at 110.

An instance of an automated assistant client 107, by way of its interactions with one or more cloud-based automated assistant components 180, may form what appears to be, from the user's perspective, a logical instance of an automated assistant 140 with which the user may engage in a human-to-computer dialog. An instance of such an automated assistant 140 is depicted in FIG. 8. It thus should be understood that in some implementations, a user that engages with an automated assistant client 107 executing on client device 106 may, in effect, engage with his or her own logical instance of an automated assistant 140. For the sakes of brevity and simplicity, the term "automated assistant" as used herein as "serving" a particular user will often refer to the combination of an automated assistant client 107 executing on a client device 106 operated by the user and one or more cloud-based automated assistant components 180 (which may be shared amongst multiple automated assistant clients of multiple client computing devices). It should also be understood that in some implementations, automated assistant 140 may respond to a request from any user regardless of whether the user is actually "served" by that particular instance of automated assistant 140.

The client computing device 106 may be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided. In various implementations, the client computing device 106 may optionally operate one or more other applications that are in addition to automated assistant client 107, such as a message exchange client (e.g., SMS, MMS, online chat), a browser, and so forth. In some of those various implementations, one or more of the other applications can optionally interface (e.g., via an application programming interface) with the automated assistant 140, or include their own instance of an automated assistant application (that may also interface with the cloud-based automated assistant component(s) 180).

Automated assistant 140 engages in human-to-computer dialog sessions with a user via user interface input and output devices of the client device 106. To preserve user privacy and/or to conserve resources, in many situations a user must often explicitly invoke the automated assistant 140 before the automated assistant will fully process a spoken utterance. The explicit invocation of the automated assistant 140 can occur in response to certain user interface input received at the client device 106. For example, user interface inputs that can invoke the automated assistant 140 via the client device 106 can optionally include actuations of a hardware and/or virtual button of the client device 106. Moreover, the automated assistant client can include one or more local engines 108, such as an invocation engine that is operable to detect the presence of one or more spoken invocation phrases. The invocation engine can invoke the automated assistant 140 in response to detection of one of the spoken invocation phrases. For example, the invocation engine can invoke the automated assistant 140 in response to detecting a spoken invocation phrase such as "Hey Assistant," "OK Assistant", and/or "Assistant". The invocation engine can continuously process (e.g., if not in an "inactive" mode) a stream of audio data frames that are based on output from one or more microphones of the client device 106, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 140. As used herein, "invoking" the automated assistant 140 can include causing one or more previously inactive functions of the automated assistant 140 to be activated. For example, invoking the automated assistant 140 can include causing one or more local engines 108 and/or cloud-based automated assistant components 180 to further process audio data frames based on which the invocation phrase was detected, and/or one or more following audio data frames (whereas prior to invoking no further processing of audio data frames was occurring). For instance, local and/or cloud-based components can generate refined versions of audio data and/or perform other processing in response to invocation of the automated assistant 140. In some implementations, the spoken invocation phrase can be processed to generate a speaker embedding that is used in generating a refined version of audio data that follows the spoken invocation phrase. In some implementations, the spoken invocation phrase can be processed to identify an account associated with a speaker of the spoken invocation phrase, and a stored speaker embedding associated with the account utilized in generating a refined version of audio data that follows the spoken invocation phrase.

The one or more local engine(s) 108 of automated assistant 140 are optional, and can include, for example, the invocation engine described above, a local voice-to-text ("STT") engine (that converts captured audio to text), a local text-to-speech ("TTS") engine (that converts text to speech), a local natural language processor (that determines semantic meaning of audio and/or text converted from audio), and/or other local components. Because the client device 106 is relatively constrained in terms of computing resources (e.g., processor cycles, memory, battery, etc.), the local engines 108 may have limited functionality relative to any counterparts that are included in cloud-based automated assistant components 180.

Cloud-based automated assistant components 180 leverage the virtually limitless resources of the cloud to perform more robust and/or more accurate processing of audio data, and/or other user interface input, relative to any counterparts of the local engine(s) 108. Again, in various implementations, the client device 106 can provide audio data and/or other data to the cloud-based automated assistant components 180 in response to the invocation engine detecting a spoken invocation phrase, or detecting some other explicit invocation of the automated assistant 140.

The illustrated cloud-based automated assistant components 180 include a cloud-based TTS module 181, a cloud-based STT module 182, a natural language processor 183, a dialog state tracker 184, and a dialog manager 185. The illustrated cloud-based automated assistant components 180 also include the refinement engine 120 that utilizes generative model 156 in generating refined version(s) of audio data, and that can provide the refined version(s) to one or more other cloud-based automated assistant components 180 (e.g., STT module 182, natural language processor 183, dialog state tracker 184, and/or dialog manager 185). Further, the cloud-based automated assistant components 180 include the speaker embedding engine 125 that utilizes the speaker embedding model for various purposes described herein.

In some implementations, one or more of the engines and/or modules of automated assistant 140 may be omitted, combined, and/or implemented in a component that is separate from automated assistant 140. For example, in some implementations, the refinement engine 120, the generative model 156, the speaker embedding engine 125, and/or the speaker embedding model 152 can be implemented, in whole or in part, on the client device 106. Further, in some implementations automated assistant 140 can include additional and/or alternative engines and/or modules.

Cloud-based STT module 182 can convert audio data into text, which may then be provided to natural language processor 183. In various implementations, the cloud-based STT module 182 can covert audio data into text based at least in part on refined version(s) of audio data that are provided by the refinement engine 120.

Cloud-based TTS module 181 can convert textual data (e.g., natural language responses formulated by automated assistant 140) into computer-generated speech output. In some implementations, TTS module 181 may provide the computer-generated speech output to client device 106 to be output directly, e.g., using one or more speakers. In other implementations, textual data (e.g., natural language responses) generated by automated assistant 140 may be provided to one of the local engine(s) 108, which may then convert the textual data into computer-generated speech that is output locally.

Natural language processor 183 of automated assistant 140 processes free form natural language input and generates, based on the natural language input, annotated output for use by one or more other components of the automated assistant 140. For example, the natural language processor 183 can process natural language free-form input that is textual input that is a conversion, by STT module 182, of audio data provided by a user via client device 106. The generated annotated output may include one or more annotations of the natural language input and optionally one or more (e.g., all) of the terms of the natural language input.

In some implementations, the natural language processor 183 is configured to identify and annotate various types of grammatical information in natural language input. In some implementations, the natural language processor 183 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, the natural language processor 183 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there." In some implementations, one or more components of the natural language processor 183 may rely on annotations from one or more other components of the natural language processor 183. In some implementations, in processing a particular natural language input, one or more components of the natural language processor 183 may use related prior input and/or other related data outside of the particular natural language input to determine one or more annotations.

In some implementations, dialog state tracker 184 may be configured to keep track of a "dialog state" that includes, for instance, a belief state of a one or more users' goals (or "intents") over the course of a human-to-computer dialog session and/or across multiple dialog sessions. In determining a dialog state, some dialog state trackers may seek to determine, based on user and system utterances in a dialog session, the most likely value(s) for slot(s) that are instantiated in the dialog. Some techniques utilize a fixed ontology that defines a set of slots and the set of values associated with those slots. Some techniques additionally or alternatively may be tailored to individual slots and/or domains. For example, some techniques may require training a model for each slot type in each domain.

Dialog manager 185 may be configured to map a current dialog state, e.g., provided by dialog state tracker 184, to one or more "responsive actions" of a plurality of candidate responsive actions that are then performed by automated assistant 140. Responsive actions may come in a variety of forms, depending on the current dialog state. For example, initial and midstream dialog states that correspond to turns of a dialog session that occur prior to a last turn (e.g., when the ultimate user-desired task is performed) may be mapped to various responsive actions that include automated assistant 140 outputting additional natural language dialog. This responsive dialog may include, for instance, requests that the user provide parameters for some action (i.e., fill slots) that dialog state tracker 184 believes the user intends to perform. In some implementations, responsive actions may include actions such as "request" (e.g., seek parameters for slot filling), "offer" (e.g., suggest an action or course of action for the user), "select," "inform" (e.g., provide the user with requested information), "no match" (e.g., notify the user that the user's last input is not understood), a command to a peripheral device (e.g., to turn off a light bulb), and so forth.

Turning now to FIG. 9, another example environment is illustrated where implementations disclosed herein can be performed. An automated assistant is not included in FIG. 9. Rather, in FIG. 9 the client device 106 does not include an automated assistant client. Further, in FIG. 9 a remote speech processing system 190 is included in lieu of cloud-based automated assistant component(s).

In FIG. 9, the client device 106 submits a request 970 via one or more local and/or wide area networks (e.g., the Internet) indicated generally at 110. The request 970 is a speech processing request and can be submitted via an API defined for the remote speech processing system 170. The request 970 can include audio data, and can optionally define type(s) of speech processing that are to be performed on the audio data in response to the request 970. The remote speech processing system 170 can handle requests from the client device 106, as well as requests from various other computing devices. The remote speech processing system 170 can be implemented, for example, on a cluster of one or more server devices.

In response to receiving the request 970, the remote speech processing system 190 performs one or more speech processing functionalities on the audio data included in the request, such as those described herein, and returns speech processing results in the form of a response 971 that is transmitted back to the client device 106 via network 110. For example, the remote speech processing system 190 includes the refinement engine 120 that utilizes generative model 156 in generating refined versions of audio data, and speaker embedding engine 125 that utilizes speaker embedding model 152 in generating speaker embeddings. These engines can be utilized cooperatively to generate speaker diarization results that are included in response 971 and/or refined version(s) of audio data that are included in response 971. Further, the remote speech processing system 190 also includes STT module 182 and natural language processor 183. Those components can have the same and/or similar functionality as described above with respect to FIG. 8. In some implementations, output generated utilizing those components can additionally be included in the response 971.

Figure 11:
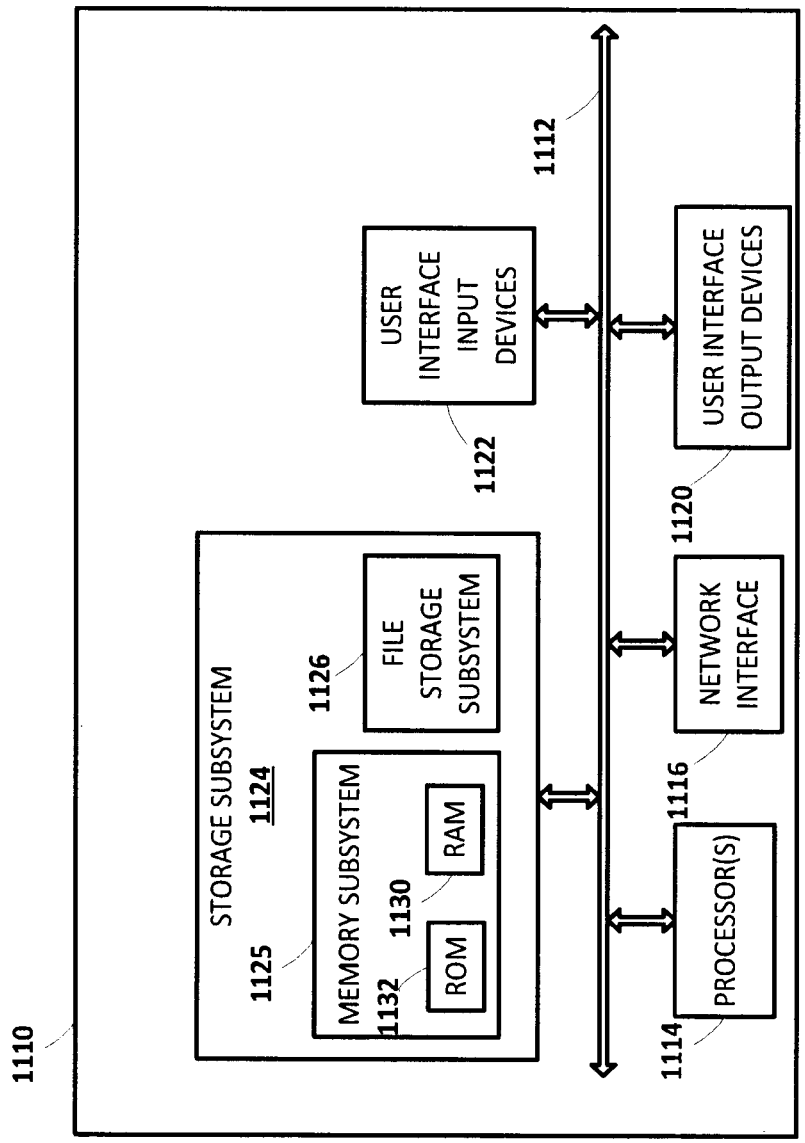
FIG. 11 illustrates an example architecture of a computing device.

FIG. 11 is a block diagram of an example computing device 1110 that may optionally be utilized to perform one or more aspects of techniques described herein. For example, client device 106 can include one or more components of example computing device 1110 and/or one or more server devices that implement cloud-based automated assistant components 180 and/or remote speech processing system 190 can include one or more components of example computing device 1110.

Computing device 1110 typically includes at least one processor 1114 which communicates with a number of peripheral devices via bus subsystem 1112. These peripheral devices may include a storage subsystem 1124, including, for example, a memory subsystem 1125 and a file storage subsystem 1126, user interface output devices 1120, user interface input devices 1122, and a network interface subsystem 1116. The input and output devices allow user interaction with computing device 1110. Network interface subsystem 1116 provides an interface to outside networks and is coupled to corresponding interface devices in other computing devices.

User interface input devices 1122 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1110 or onto a communication network.

User interface output devices 1120 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1110 to the user or to another machine or computing device.

Storage subsystem 1124 stores programming and data constructs that provide the functionality of some or all of the modules described herein. For example, the storage subsystem 1124 may include the logic to perform selected aspects of the methods described herein and/or to implement various components depicted herein.

These software modules are generally executed by processor 1114 alone or in combination with other processors. Memory 1125 used in the storage subsystem 1124 can include a number of memories including a main random access memory (RAM) 1130 for storage of instructions and data during program execution and a read only memory (ROM) 1132 in which fixed instructions are stored. A file storage subsystem 1126 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1126 in the storage subsystem 1124, or in other machines accessible by the processor(s) 1114.

Bus subsystem 1112 provides a mechanism for letting the various components and subsystems of computing device 1110 communicate with each other as intended. Although bus subsystem 1112 is shown schematically as a single bus, alternative implementations of the bus subsystem may use multiple busses.

Computing device 1110 can be of varying types including a workstation, server, computing cluster, blade server, server farm, or any other data processing system or computing device. Due to the ever-changing nature of computers and networks, the description of computing device 1110 depicted in FIG. 11 is intended only as a specific example for purposes of illustrating some implementations. Many other configurations of computing device 1110 are possible having more or fewer components than the computing device depicted in FIG. 11.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

What is claimed is:

1. A method implemented by one or more processors, the method comprising:
    generating a speaker embedding for a human speaker, wherein generating the speaker embedding for the human speaker comprises:
        processing one or more instances of speaker audio data, corresponding to the human speaker, using a trained speaker embedding model, and
        generating the speaker embedding based on one or more instances of output each generated based on processing a respective of the one or more instances of speaker audio data using the trained speaker embedding model;
    receiving audio data that captures one or more utterances of the human speaker and that also captures one or more additional sounds that are not from the human speaker;
    generating a refined version of the audio data, wherein the refined version of the audio data isolates the one or more utterances of the human speaker from the one or more additional sounds that are not from the human speaker, and wherein generating the refined version of the audio data comprises:
        sequentially processing the audio data using a trained generative model and using the speaker embedding in determining activations for layers of the trained generative model during the sequentially processing,
            wherein the layers of the trained generative model comprise a stack of dilated causal convolutional layers, and
            wherein using the speaker embedding in determining the activations for the layers of the trained generative model comprise using the speaker embedding in determining activations for the causal convolutional layers in the sequentially processing, and
        sequentially generating, based on the sequentially processing and as direct output from the trained generative model, the refined version of the audio data; and
    performing further processing on the refined version of the audio data, performing the further processing comprising one or both of:
        performing voice-to-text processing on the refined version of the audio data to generate predicted text for the one or more utterances of the human speaker, and
        assigning a single given speaker label to one or more temporal portions of the audio data based on the one or more temporal portions corresponding to at least a threshold level of audio in the refined version of the audio data.

2. The method of claim 1, wherein the audio data is captured via one or more microphones of a client device and wherein generating the speaker embedding for the human speaker occurs after at least part of the audio data is captured via the one or more microphones of the client device.

3. The method of claim 2, wherein the one or more instances of the speaker audio data used in generating the speaker embedding comprise an instance that is based on the audio data, and further comprising:
    identifying the instance based on the instance being from an initial occurrence of voice activity detection in the audio data.

4. The method of claim 3, further comprising:
    determining an additional portion of the audio data that corresponds to an additional human speaker of the one or more additional sounds, wherein determining the additional portion is based on the additional portion being from an additional occurrence of voice activity detection in the audio data, and not corresponding to at least a threshold level of audio in the refined version of the audio data;
    generating an additional speaker embedding for the additional human speaker, wherein generating the additional speaker embedding for the additional human speaker is based on processing of the additional portion of the audio data using the trained speaker embedding model;

generating an additional refined version of the audio data, wherein the additional refined version of the audio data isolates one or more additional speaker utterances of the additional human speaker from the one or more utterances of the human speaker and from any of the one or more additional sounds that are not from the additional human speaker, and wherein generating the additional refined version of the audio data comprises:

sequentially processing the audio data using the trained generative model and using the additional speaker embedding in determining activations for the layers of the trained generative model during the sequentially processing, and sequentially generating, based on the sequentially processing and as direct output from the trained generative model, the additional refined version of the audio data;

performing further processing on the additional refined version of the audio data.

5. The method of claim 1, wherein the audio data is captured via one or more microphones of a client device and wherein generating the speaker embedding for the human speaker occurs prior to the audio data being captured via the one or more microphones of the client device.

6. The method of claim 5, wherein the speaker audio data processed in generating the speaker embedding comprises one or more enrollment utterances spoken by the human speaker during enrollment with a digital system.

7. The method of claim 6, wherein the speaker embedding is stored locally at the client device during the enrollment with the digital system, and wherein the speaker embedding is used in generating the refined version of the audio data based on the audio data being captured via the client device.

8. The method of claim 7, wherein an additional embedding, for an additional human speaker, is stored locally at the client device during an additional enrollment of the additional human speaker with the digital system, and further comprising:

selecting the speaker embedding, in lieu of the additional embedding, based on sensor data captured at the client device indicating that the human speaker is currently interfacing with the client device.

9. The method of claim 8, wherein the sensor data is additional audio data that precedes the audio data, wherein the additional audio data is an invocation phrase for invoking the digital system, and wherein the additional audio data indicates that the human speaker is currently interfacing with the client device based on the additional audio data corresponding to the human speaker.

10. The method of claim 1, wherein the audio data is received via an automated assistant interface of an automated assistant, wherein performing the further processing comprises performing voice-to-text processing on the refined version of the audio data to generate the predicted text for the one or more utterances of the human speaker, and further comprising:

generating responsive content based on the predicted text; and causing the responsive content to be rendered via the automated assistant interface of the automated assistant.

11. The method of claim 1, wherein the audio data is received via at least one microphone of a client device, and wherein performing the further processing comprises performing voice-to-text processing on the refined version of the audio data to generate the predicted text, and further comprising:

causing the predicted text to be rendered via a display of the client device.

12. The method of claim 1, wherein the audio data is received, via one or more network interfaces, as part of a speech processing request transmitted utilizing an application programming interface, and further comprising:

transmitting, in response to the speech processing request, one or both of:

the predicted text, and an indication of the assignment of the single given speaker label to the one or more temporal portions.

13. A method implemented by one or more processors, the method comprising:

invoking an automated assistant client at a client device, wherein invoking the automated assistant client is in response to detecting one or more invocation cues in received user interface input;

in response to invoking the automated assistant client:

performing certain processing of initial spoken input received via one or more microphones of the client device;

generating a responsive action based on the certain processing of the initial spoken input;

causing performance of the responsive action;

determining that a continued listening mode is activated for the automated assistant client at the client device;

in response to the continued listening mode being activated:

automatically monitoring for additional spoken input after causing performance of at least part of the responsive action;

receiving audio data during the automatically monitoring;

determining whether the audio data includes any additional spoken input that is from the same human speaker that provided the initial spoken input, wherein determining whether the audio data includes the additional spoken input that is from the same human speaker comprises:

identifying a speaker embedding for the human speaker that provided the initial spoken input;

generating a refined version of the audio data that isolates any of the audio data that is from the human speaker, wherein generating the refined version of the audio data comprises:

processing the audio data using a trained generative model and using the speaker embedding in determining activations for layers of the trained generative model during the processing, and generating, based on the processing and as direct output from the trained generative model, the refined version of the audio data; and determining whether the audio data includes any additional spoken input that is from the same human speaker based on whether any portions of the refined version of the audio data correspond to at least a threshold level of audio; and in response to determining that the audio data does not include any additional spoken input that is from the same human speaker suppressing one or both of:

performance of at least some of the certain processing, for the audio data; and generating of any additional responsive action that is tailored to the audio data.

14. A method of training a machine learning model to generate refined versions, of audio data, that isolate any utterances of a target human speaker, the method implemented by one or more processors and comprising:

identifying an instance of audio data that includes spoken input from only a first human speaker;

generating a speaker embedding for the first human speaker;

identifying an additional instance of audio data that lacks any spoken input from the first human speaker, and that includes spoken input from at least one additional human speaker;

generating a mixed instance of audio data that combines the instance of audio data and the additional instance of audio data;

processing the mixed instance of audio data using the machine learning model and using the speaker embedding in determining activations for layers of the machine learning model during the processing;

generating, based on the processing and as direct output from the machine learning model, a predicted refined version of the audio data;

generating a loss based on comparing the predicted refined version of the audio data to the instance of audio data that includes the spoken input from only the first human speaker;

updating one or more weights of the machine learning model based on the loss; and subsequent to updating the one or more weights of the machine learning model based on the generated loss, and based on additional generated losses based on additional training instances:

using the machine learning model in performing speaker diarization of subsequent audio data.

15. The method of claim 14, wherein the layers of the machine learning model comprise a stack of dilated causal convolutional layers, and wherein using the speaker embedding in determining the activations for the layers of the machine learning model comprise using the speaker embedding in determining activations for the causal convolutional layers in the processing.

* * * * *